US011618177B1

(12) United States Patent
Boesel et al.

(10) Patent No.: US 11,618,177 B1
(45) Date of Patent: Apr. 4, 2023

(54) ORBITAL KNIFE

(71) Applicants: Bradley W Boesel, Phoenix, AZ (US); Mujdat Kandemir, Cincinnati, OH (US)

(72) Inventors: Bradley W Boesel, Phoenix, AZ (US); Mujdat Kandemir, Cincinnati, OH (US)

( * ) Notice: Subject to any disclaimer, the term of this patent is extended or adjusted under 35 U.S.C. 154(b) by 0 days.

(21) Appl. No.: 17/945,924

(22) Filed: Sep. 15, 2022

Related U.S. Application Data

(60) Provisional application No. 63/330,109, filed on Apr. 12, 2022.

(51) Int. Cl.

| | |
|---|---|
| ***B23D 25/12*** | (2006.01) |
| ***B26D 1/40*** | (2006.01) |
| ***B26D 3/14*** | (2006.01) |
| ***B26D 7/26*** | (2006.01) |
| ***B26F 1/38*** | (2006.01) |
| ***B26D 1/22*** | (2006.01) |
| ***B26D 5/08*** | (2006.01) |
| ***B26D 1/147*** | (2006.01) |

(52) U.S. Cl.
CPC ........... *B26D 1/225* (2013.01); *B26D 1/1475* (2013.01); *B26D 5/08* (2013.01)

(58) Field of Classification Search
CPC ... B26F 1/384; B26F 1/42; B26F 1/44; B26D 1/405; B26D 3/14; B26D 7/265; B26D 7/204
USPC ................. 83/426, 343, 344, 564, 658, 659, 83/673–675; 156/515, 251, 308.4, 530
See application file for complete search history.

(56) References Cited

U.S. PATENT DOCUMENTS

| | | | | |
|---|---|---|---|---|
| 3,224,311 A * | 12/1965 | Wagner | .................. | B26D 1/245 83/345 |
| 4,014,234 A | 3/1977 | Spengler | | |
| 4,033,212 A | 7/1977 | Hasegawa | | |
| 4,082,023 A * | 4/1978 | Hertsius | ................. | B23D 23/00 83/369 |
| 4,170,155 A | 10/1979 | Saito | | |
| 4,171,780 A | 10/1979 | Bugnone | | |
| 4,240,312 A | 10/1980 | Ward | | |
| 4,262,566 A | 4/1981 | Fondronnier | | |
| 4,336,812 A | 6/1982 | Seragnoli | | |
| 4,355,554 A | 10/1982 | Gregory | | |
| 4,625,902 A | 12/1986 | Billberg | | |
| 4,630,514 A | 12/1986 | Ohmori | | |

(Continued)

FOREIGN PATENT DOCUMENTS

CN 110228100 A * 6/2019 ........... B26D 7/2635

*Primary Examiner* — Ghassem Alie
(74) *Attorney, Agent, or Firm* — Kenneth Motolenich-Salas

(57) ABSTRACT

An orbital knife including a support structure; a yoke rotatably attached to the support structure constituting a yoke hub and a plurality of yoke arms; one or more rotatable knife rolls securely connected to at least one of the plurality of yoke arms; one or more blades attached to each of the one or more knife rolls and including a cutting element; one or more sun gears rotatably attached to the support structure; an anvil roll rotatably attached to the support structure; and one or more planet gears wherein each knife roll has rotatably attached thereto at least one planet gear and each planet gear is mated with a sun gear.

19 Claims, 11 Drawing Sheets

(56) References Cited

U.S. PATENT DOCUMENTS

| | | | | | |
|---|---|---|---|---|---|
| 4,691,603 | A | * | 9/1987 | Winnemoller | B26D 7/1818 83/343 |
| 4,701,239 | A | | 10/1987 | Craig | |
| 4,732,067 | A | | 3/1988 | Yamada | |
| 4,750,394 | A | | 6/1988 | Suzuki | |
| 4,779,781 | A | | 10/1988 | Billberg | |
| 4,811,641 | A | | 3/1989 | Muller | |
| 4,860,623 | A | | 8/1989 | Pawelko | |
| 4,896,605 | A | | 1/1990 | Schroder | |
| 4,913,013 | A | | 4/1990 | Osborn | |
| 4,914,995 | A | | 4/1990 | Osborn | |
| 4,972,745 | A | | 11/1990 | Bruder | |
| 4,982,637 | A | | 1/1991 | Osborn | |
| 5,047,607 | A | | 9/1991 | Briffod | |
| 5,048,387 | A | * | 9/1991 | Niitsuma | B41F 13/62 83/507 |
| 5,088,368 | A | | 2/1992 | Marion | |
| 5,088,972 | A | | 2/1992 | Parker | |
| 5,134,013 | A | | 7/1992 | Parker | |
| 5,173,352 | A | | 12/1992 | Parker | |
| 5,251,836 | A | | 10/1993 | Pack | |
| 5,309,804 | A | | 5/1994 | Norris | |
| 5,367,936 | A | | 11/1994 | Held | |
| 5,403,259 | A | | 4/1995 | Parker | |
| 5,419,582 | A | * | 5/1995 | Norris | B26F 1/0015 412/1 |
| 5,477,656 | A | | 12/1995 | Loewenthal | |
| 5,518,544 | A | | 5/1996 | Higginson | |
| 5,573,491 | A | | 11/1996 | Parker | |
| 5,622,113 | A | | 4/1997 | Hansen | |
| 5,674,334 | A | | 10/1997 | Instance | |
| 5,720,210 | A | | 2/1998 | Okahashi | |
| 5,725,320 | A | | 3/1998 | Austin | |
| 5,779,831 | A | | 7/1998 | Schmitz | |
| 5,802,941 | A | | 9/1998 | Kline | |
| 5,918,518 | A | | 7/1999 | Kobayashi | |
| 5,967,011 | A | | 10/1999 | Feldkamper | |
| 6,009,781 | A | | 1/2000 | McNeil | |
| 6,012,365 | A | | 1/2000 | Dufour | |
| 6,023,917 | A | | 2/2000 | Cardone | |
| 6,058,817 | A | | 5/2000 | Kobayashi | |
| 6,112,628 | A | | 9/2000 | Kline | |
| 6,196,105 | B1 | | 3/2001 | Hansen | |
| 6,401,583 | B1 | | 6/2002 | Kishine | |
| 6,412,383 | B1 | | 7/2002 | Henry | |
| 6,481,318 | B1 | | 11/2002 | Kinigakis | |
| 6,739,545 | B2 | | 5/2004 | Drefs | |
| 6,755,371 | B2 | | 6/2004 | Watanabe | |
| 6,805,181 | B2 | * | 10/2004 | Blundell | B29C 66/83513 156/530 |
| 6,811,640 | B2 | | 11/2004 | Franko | |
| 6,858,105 | B2 | | 2/2005 | Hartman | |
| 6,860,309 | B2 | | 3/2005 | Hartman | |
| 6,893,528 | B2 | | 5/2005 | Middelstadt | |
| 7,005,028 | B2 | | 2/2006 | Middelstadt | |
| 7,007,602 | B2 | | 3/2006 | Kiyota | |
| 7,008,497 | B2 | | 3/2006 | Nakakado | |
| 7,017,484 | B2 | | 3/2006 | Kiyota | |
| 7,083,137 | B2 | | 8/2006 | Watanabe | |
| 7,127,975 | B2 | | 10/2006 | Miyatake | |
| 7,135,083 | B2 | | 11/2006 | Middelstadt | |
| 7,191,690 | B2 | | 3/2007 | Pollock | |
| 7,216,685 | B2 | | 5/2007 | Nakakado | |
| 7,243,585 | B2 | | 7/2007 | Miyatake | |
| 7,311,651 | B2 | | 12/2007 | Stab | |
| 7,326,161 | B2 | | 2/2008 | Ishikawa | |
| 7,338,425 | B1 | | 3/2008 | Whitten | |
| 7,571,584 | B2 | | 8/2009 | Lerner | |
| 7,587,966 | B2 | | 9/2009 | Nakakado | |
| 7,647,698 | B2 | | 1/2010 | Closmann | |
| 7,722,517 | B2 | | 5/2010 | Chen | |
| 7,771,335 | B2 | | 8/2010 | Wingate | |
| 7,771,336 | B2 | | 8/2010 | Shoji | |
| 7,780,156 | B2 | | 8/2010 | Schmitz | |
| 7,883,455 | B2 | | 2/2011 | Held | |
| 8,002,928 | B2 | | 8/2011 | Nakakado | |
| 8,062,459 | B2 | | 11/2011 | Nakakado | |
| 8,096,931 | B2 | | 1/2012 | Yamamoto | |
| 8,123,665 | B2 | | 2/2012 | De Matteis | |
| 8,226,534 | B2 | | 7/2012 | Chaturvedi | |
| 8,276,638 | B2 | | 10/2012 | Yamamoto | |
| 8,292,792 | B2 | | 10/2012 | Yamamoto | |
| 8,326,205 | B2 | | 12/2012 | Miyazaki | |
| 8,342,675 | B2 | | 1/2013 | Motojima | |
| 8,353,236 | B2 | | 1/2013 | De Marco | |
| 8,356,650 | B2 | | 1/2013 | Takahashi | |
| 8,403,575 | B2 | | 3/2013 | Gocho | |
| 8,440,043 | B1 | | 5/2013 | Schneider | |
| 8,540,795 | B2 | | 9/2013 | Carpenter | |
| 8,640,579 | B2 | | 2/2014 | Pedercini | |
| 8,663,420 | B2 | | 3/2014 | Nakakado | |
| 8,789,572 | B2 | | 7/2014 | Yamamoto | |
| 8,863,627 | B2 | | 10/2014 | Kandemir | |
| 8,920,298 | B2 | | 12/2014 | Gerhard | |
| 9,003,935 | B2 | | 4/2015 | Herlinger | |
| 9,003,939 | B2 | * | 4/2015 | Dijon | B26D 1/405 83/564 |
| 9,027,917 | B2 | | 5/2015 | Annerstedt | |
| 9,120,588 | B2 | | 9/2015 | Deckert | |
| 9,162,413 | B2 | | 10/2015 | Hartman | |
| 9,278,460 | B2 | | 3/2016 | Meznaric | |
| 9,279,199 | B2 | | 3/2016 | Matsumoto | |
| 9,289,911 | B2 | | 3/2016 | Andreato | |
| 9,289,912 | B2 | | 3/2016 | Bayzelon | |
| 9,295,592 | B2 | | 3/2016 | Yamamoto | |
| 9,327,417 | B2 | | 5/2016 | Saga | |
| 9,364,965 | B2 | | 6/2016 | Schneider | |
| 9,381,661 | B2 | | 7/2016 | Ingole | |
| 9,382,026 | B2 | | 7/2016 | Ippers | |
| 9,434,083 | B2 | | 9/2016 | Douillard | |
| 9,468,563 | B2 | | 10/2016 | Coe | |
| 9,517,573 | B2 | | 12/2016 | Schneider | |
| 9,522,477 | B2 | | 12/2016 | Endoh | |
| 9,539,735 | B2 | | 1/2017 | Ferguson | |
| 9,636,837 | B2 | | 5/2017 | Kandemir | |
| 9,693,909 | B2 | | 7/2017 | Tombuelt-Meyer | |
| 9,738,002 | B2 | | 8/2017 | Schneider | |
| 9,782,904 | B2 | | 10/2017 | Bayzelon | |
| 9,808,947 | B2 | | 11/2017 | Grubka | |
| 9,841,265 | B2 | | 12/2017 | VanValkenburgh | |
| 9,868,606 | B2 | | 1/2018 | Hargett | |
| 9,895,821 | B2 | | 2/2018 | Wada | |
| 9,914,234 | B2 | | 3/2018 | Baggot | |
| 9,943,977 | B2 | | 4/2018 | Secondi | |
| 9,993,932 | B2 | | 6/2018 | Saiamone | |
| 10,039,674 | B2 | | 8/2018 | Wada | |
| 10,059,015 | B2 | | 8/2018 | Schneider | |
| 10,059,016 | B2 | | 8/2018 | Grubka | |
| 10,117,455 | B2 | | 11/2018 | Beckmann | |
| 10,173,336 | B2 | | 1/2019 | Sposato | |
| 10,179,422 | B2 | | 1/2019 | Lodi | |
| 10,207,416 | B2 | | 2/2019 | Secondi | |
| 10,226,386 | B2 | | 3/2019 | Long | |
| 10,279,496 | B2 | | 5/2019 | Hartman | |
| 10,286,568 | B2 | | 5/2019 | Pras | |
| 10,307,982 | B2 | | 6/2019 | Adams | |
| 10,328,590 | B2 | | 6/2019 | Bormann | |
| 10,357,954 | B2 | | 7/2019 | Liebler | |
| 10,391,657 | B2 | | 8/2019 | Ferguson | |
| 10,391,663 | B2 | | 8/2019 | Tsuji | |
| 10,406,795 | B2 | | 9/2019 | Nishimura | |
| 10,442,103 | B2 | | 10/2019 | Bormann | |
| 10,456,949 | B2 | | 10/2019 | Ufer | |
| 10,471,620 | B2 | | 11/2019 | Bittner | |
| 10,543,674 | B2 | | 1/2020 | Bormann | |
| 10,576,650 | B2 | | 3/2020 | Bayer | |
| 10,589,487 | B2 | | 3/2020 | Adams | |
| 10,610,417 | B2 | | 4/2020 | Wada | |
| 10,653,565 | B2 | | 5/2020 | Long | |
| 10,669,057 | B2 | | 6/2020 | Claire | |
| 10,744,664 | B2 | | 8/2020 | Adami | |
| 10,744,665 | B2 | | 8/2020 | Kagawa | |
| 10,800,061 | B2 | | 10/2020 | Yamamuro | |
| 10,806,635 | B2 | | 10/2020 | Schneider | |

(56) References Cited

U.S. PATENT DOCUMENTS

| | | | |
|---|---|---|---|
| 10,807,263 B2 | 10/2020 | Busch | |
| 10,814,578 B2 | 10/2020 | Schalk | |
| 10,815,042 B2 | 10/2020 | Cardin | |
| 10,821,032 B2 | 11/2020 | Piantoni | |
| 10,828,794 B2 | 11/2020 | Okabe | |
| 10,836,149 B2 | 11/2020 | Oetjen | |
| 10,837,133 B2 | 11/2020 | Kim | |
| 10,851,824 B2 | 12/2020 | Vorderwisch | |
| 10,857,704 B2 | 12/2020 | Derry | |
| 10,871,758 B2 | 12/2020 | Fagan | |
| 10,875,735 B2 | 12/2020 | Leufstadius | |
| 10,882,204 B2 | 1/2021 | Beckonert | |
| 10,894,687 B2 | 1/2021 | McCabe | |
| 10,899,568 B2 | 1/2021 | Pasquale | |
| 10,906,686 B2 | 2/2021 | Hopner | |
| 10,913,561 B2 | 2/2021 | Wetsch | |
| 10,913,631 B2 | 2/2021 | Meyerhans | |
| 10,919,252 B2 | 2/2021 | Ackerman | |
| 10,926,430 B2 | 2/2021 | Coursey | |
| 10,927,479 B2 | 2/2021 | Samejima | |
| 10,938,284 B2 | 3/2021 | Huber | |
| 10,966,875 B2 | 4/2021 | Heege | |
| 10,967,441 B2 | 4/2021 | DeLuca | |
| 10,968,065 B2 | 4/2021 | Silva | |
| 11,007,665 B2 | 5/2021 | Reisz | |
| 11,020,282 B2 | 6/2021 | Back | |
| 11,020,868 B2 | 6/2021 | Laurikainen | |
| 11,020,929 B2 | 6/2021 | Takemoto | |
| 11,028,536 B2 | 6/2021 | Miyasaka | |
| 11,040,499 B2 | 6/2021 | Eickhoff | |
| 11,052,054 B2 | 7/2021 | Fotinos | |
| 11,052,571 B2 | 7/2021 | Bold | |
| 11,053,158 B2 | 7/2021 | Fazio | |
| 11,059,626 B2 | 7/2021 | Inagawa | |
| 11,065,708 B2 | 7/2021 | Fagan | |
| 11,084,681 B2 | 8/2021 | Andersson | |
| 11,089,815 B2 | 8/2021 | Persson | |
| 11,090,844 B2 | 8/2021 | Bahr | |
| 11,090,896 B2 | 8/2021 | Hanauer | |
| 11,091,288 B1 | 8/2021 | Claire | |
| 11,096,686 B2 | 8/2021 | Thompson | |
| 11,124,326 B2 | 9/2021 | Vitiello | |
| 11,130,650 B2 | 9/2021 | Gerhardt | |
| 11,142,730 B2 | 10/2021 | Huang et al. | |
| 11,154,429 B2 | 10/2021 | Coe | |
| 11,161,332 B2 | 11/2021 | Nash | |
| 11,162,707 B2 | 11/2021 | Collmer | |
| 11,186,029 B2 | 11/2021 | Thaler | |
| 11,193,238 B2 | 12/2021 | Oguchi | |
| 11,203,128 B2 | 12/2021 | Fukasawa et al. | |
| 11,208,249 B2 | 12/2021 | Ellis | |
| 11,209,370 B2 | 12/2021 | Ohora | |
| 11,225,884 B2 | 1/2022 | Haxhiu | |
| 11,244,376 B1 | 2/2022 | Van Thomme | |
| 11,247,428 B2 | 2/2022 | Varriano-Marston | |
| 11,248,320 B2 | 2/2022 | Mueller | |
| 11,253,711 B2 | 2/2022 | Sherwood | |
| 11,273,570 B2 | 3/2022 | Hartman | |
| 11,273,934 B2 | 3/2022 | Gundelach | |
| 11,279,106 B2 | 3/2022 | Linnestad | |
| 11,285,450 B2 | 3/2022 | Pielsticker | |
| 2022/0152862 A1* | 5/2022 | Forman | B26F 1/42 |

* cited by examiner

ORBITAL KNIFE

CLAIM OF PRIORITY

This application claims the benefit of and priority to Provisional Patent Application No. 63/330,109 filed Apr. 12, 2022, the entirety of which is incorporated herein by this reference.

FIELD OF THE INVENTION

The invention is an apparatus for the repeated and accurate cutting a moving extended length of material into discrete pieces of predetermined length.

BACKGROUND OF THE INVENTION

A variety of manufacturing processes, such as, by way of inclusion and not of limitation, production of disposable personal hygiene products, require that an extended, continuous length of material, referred to herein as a web of material or simply as a web, having a longitudinal (i.e., lengthwise) dimension significantly greater than the other two dimensions (i.e., the axial [width-wise] direction and vertical dimension which defines the thickness of such material and is smaller than the axial direction), be divided, or cut, into discrete pieces of predetermined length with separations commonly perpendicular to the longitudinal dimension. There are a variety of technologies used to accomplish this task, with burst cutting being one of the fundamental processes employed.

With reference to FIGS. 1(*a*) and 1(*b*), a prior art cutting apparatus P for use in burst cutting is depicted. The cutting assembly P is comprised of a support structure 5 to which is rotatably attached a knife roll 20 which has an axis of rotation 26. Rotation of the knife roll 20 is effectuated by a knife roll motor 25. Removably attached to the knife roll 20 is a blade 80 comprising an upper end proximal and clamped to the knife roll 20 (i.e., upper end is fixed) and a (free) lower end comprising a cutting element 88 positioned parallel to the longitudinal axis of the knife roll 20. The blade 80, which generally has a rectangular cross section, is defined by four length edges, four thickness edges, and four width edges. The cutting element 88 is generally characterized as a narrow sharp edge which extends axially and generally perpendicular to the longitudinal dimension of the web 100 (longest/lengthwise dimension of the web). In general practice, the any one or more of the length edges of blade 80 can comprise a cutting element 88 such that, potentially, blade 80 can have up to four cutting elements 88 so that blade 80 has an effective service life four times that of a blade 80 with only one edge formed into a cutting element 88. The length of the cutting element 88 is generally longer than the width of the web 100 (e.g., the axial dimension of the web 100).

Also rotatably attached to the support structure 5 is an anvil roll 50 with axis of rotation 56 wherein rotation of the anvil roll 50 is effectuated by an anvil roll motor 55. Removably attached to anvil roll 50 is an adjustable anvil 53 which is adjustable spatially in a direction radial proximally and distally from the center of anvil roll 50. The blade 80 upper edge is proximal and attached to the knife roll 20 and the blade lower end with cutting element 88 is proximal the anvil roll 50 so as to effectuate a cut of web 100 when web 100 passes between knife roll 20 and anvil roll 50 as further described herein. Anvil roll 50 of orbital knife 1, amongst its multiple attributes, serves the anvil 53 function of prior art cutting apparatus P in that it provides a surface against which the cutting element 88 presses to effect a cut of web 100.

As indicated above, the lower end of blade 80 is free (unclamped) to deflect, enabling the cutting element 88 to be positioned proximally anvil 53 to effectuate the cutting operation of web 100 disposed on a conveyor comprised of an infeed conveyor 104 positioned to the posterior of cutting apparatus P and spaced apart from a discharge conveyor 105 positioned to the anterior of cutting apparatus P. Given the spaced-apart nature of infeed conveyor 104 and discharge conveyor 105, a small gap exists between these structures and it is in this gap where cutting element 88 contacts web 100, which is disposed on anvil 53 in the gap, to effectuate a cut of web 100 resulting in individual cut web pieces 101.

The longitudinal axis of the anvil roll 50 is parallel to the longitudinal axis of the knife roll 20. The anvil roll 50 of the cutting apparatus P generally has a curved smooth continuous surface with an axis of curvature parallel to the cutting element 88 of the blade 80. Further, the longitudinal axes of the two rolls are separated by a distance such that when the knife roll 20 is rotated about its longitudinal axis, it cannot pass the parallel surface of the anvil roll 50 (i.e., the surface parallel the cutting element positioned at the lower end of the blade 80) without displacing or deflecting the lower (free) end of the blade 80 on which cutting element 88 is disposed toward the longitudinal axis of knife roll 20. The distance between the location of the cutting element 88 on a deflected blade 80 in a state of maximum working deflection and the position of that same cutting element 88 on that same blade 80 in the undeflected condition is hereinafter referred to as interference or blade deflection and hereinafter the two terms "interference" and "blade deflection" are used interchangeable and have the same meaning. Web 100 passes through cutting apparatus P on the conveyor and is cut, resulting in individual cut web pieces 101, as a result of a load (force) imposed on anvil roll 50 by knife roll 20, causing the pushing of cutting element 88 against anvil 53, with web 100 passing between the cutting element 88 and anvil 53 with which it is in contact. The load (force) required to displace the cutting element 88 on blade 80 away from the undeflected state increases as the interference increases and it is this load (force) that effects the cut in the web 100.

During operation with both rolls 20 and 50 rotating about their respective axes of rotation 26 and 56, web 100 passes between the knife roll 20 and anvil roll 50, with the longitudinal axis (lengthwise or long dimension) of the web 100 (*i*) passing between the rolls 20 and 50 and in contact anvil 53, and (ii) perpendicular to the rolls' longitudinal axes. The cutting element 88 of the blade 80 is proximal the anvil roll 50 and, in the gap between infeed and discharge conveyors 104 and 105, contacts web 100 disposed on the anvil on the conveyor and positioned between knife roll 20 and anvil roll 50. As web 100 passes between the anvil roll 50 and knife roll 20, the force of the cutting element 88 imparted on the anvil 53 results in the application of a compressive load to the web 100. As the compressive load increases, the tensile stress in the longitudinal dimension of the web 100 and perpendicular to the direction of loading increases according to the Poisson effect until that tensile stress exceeds the level tolerable by the web and the material fractures, resulting in a generally axial cut in the web 100.

In some prior art embodiments, inserted between adjustable anvil 53 and anvil roll 50 is an adjustment member 57 which is attached to anvil roll 50 and is in contact with anvil 53. The positioning of adjustment member 57 between anvil 53 and anvil roll 50 increases or decreases the effective radius of anvil roll 50, thereby increasing or decreasing the interference (overlap) between anvil 53 and blade 80.

In practice, the amount of the referenced blade 80 deflection, referred to as interference, is small. Establishing the correct amount of blade 80 deflection is critical to effectively cutting the web 100. If there is too little deflection, operation results in the web 100 not being fully separated, and too much deflection results in the blade material wearing away at an accelerated rate or fracturing. It is typical in the prior art cutting apparatuses P that operation must be stopped in order to adjust the interference and said adjustment is frequently a tedious trial and error process requiring multiple time-consuming attempts before reaching a suitable outcome. Further, changes in temperature of the equipment during operation can result in detrimental changes to the interference (i.e., as the temperature of the support structure 5 increases due to normal operating conditions the material comprising the support structure 5 expands and the distance between the knife roll 20 center of rotation and the anvil roll 50 center of rotation increases thereby reducing the cutting element 88-to-anvil 53 interference). As such, there exists a need in the prior art to overcome this operational challenge of establishing the correct amount of blade deflection without needing to stop the machine and go through the tedious, time-consuming trial-and-error process of adjusting the cutting apparatus to establish the ideal interference. The present invention provides a means of adjusting the cutting element-to-anvil roll interference while the machine is in operation.

SUMMARY OF THE INVENTION

A first aspect of the invention comprises an orbital knife comprising (a) a support structure; (b) a yoke rotatably attached to the support structure having a yoke axis of rotation, wherein the yoke comprises a yoke hub and a plurality of yoke arms; (c) one or more rotatable knife rolls radially displaced from and parallel to the yoke hub and securely connected to at least one of the plurality of yoke arms wherein each knife roll has an axis of rotation; (d) one or more blades attached to each of the one or more knife rolls and comprising a cutting element parallel to the knife roll to which the blade of such cutting element is attached; (e) one or more sun gears rotatably attached to the support structure wherein each sun gear has (1) an axis of rotation concentric with the yoke axis of rotation, (2) associated therewith a sun gear pitch radius, and (3) attached thereto a phasing arm; (f) an anvil roll rotatably attached to the support structure and having an axis of rotation parallel to the yoke axis of rotation; and (g) one or more planet gears each with a planet gear axis of rotation and a planet gear pitch radius, wherein (1) each knife roll has rotatably attached thereto at least one planet gear, (2) each planet gear is mated with one of the one or more sun gears forming a gear train wherein the sun gear drives the planet gear and in each such gear train the planet gear pitch radius is substantially tangential to the sun gear pitch radius, and (3) the planet gear axis of rotation of each planet gear is concentric with the axis of rotation of the knife roll to which the planet gear is attached.

A second aspect of the invention comprises an orbital knife comprising (a) a support structure; (b) a yoke rotatably attached to the support structure having a yoke axis of rotation, wherein the yoke comprises a yoke hub and a plurality of yoke arms; (c) one or more rotatable knife rolls radially displaced from and parallel to the yoke hub and securely connected to at least one of the plurality of yoke arms wherein each knife roll has an axis of rotation; (d) one or more blades attached to each of the one or more knife rolls and comprising a cutting element parallel to the knife roll to which the blade of such cutting element is attached; (e) one or more sun pulleys rotatably attached to the support structure wherein each sun pulley has (1) an axis of rotation concentric with the yoke axis of rotation, (2) associated therewith a sun pulley pitch radius, and (3) attached thereto a phasing arm; (f) an anvil roll rotatably attached to the support structure and having an axis of rotation parallel to the yoke axis of rotation; and (g) one or more planet pulleys each with a planet pulley axis of rotation and a planet pulley pitch radius, wherein (1) each knife roll has attached thereto at least one planet pulley, (2) each planet pulley is joined via a drive belt with one of the one or more sun pulleys wherein rotation of the sun pulley causes rotation of the planet pulley effectuated by the force imparted by the drive belt, and (3) the planet pulley axis of rotation of each planet pulley is concentric with the axis of rotation of the knife roll to which the planet pulley is attached.

A third aspect of the invention comprises an orbital knife comprising (a) a support structure; (b) a yoke rotatably attached to the support structure having a yoke axis of rotation, wherein the yoke comprises a yoke hub and a plurality of yoke arms; (c) one or more rotatable knife rolls radially displaced from and parallel to the yoke hub and securely connected to at least two of the plurality of yoke arms wherein each knife roll has an axis of rotation; (d) one or more blades attached to each of the one or more knife rolls and comprising a cutting element parallel to the knife roll to which the blade of such cutting element is attached; (e) one or more sun gears rotatably attached to the support structure wherein each sun gear has (1) an axis of rotation concentric with the yoke axis of rotation, (2) associated therewith a sun gear pitch radius, and (3) attached thereto a phasing arm; (f) an anvil roll rotatably attached to the support structure and having an axis of rotation parallel to the yoke axis of rotation; (g) one or more idler gears wherein each such idler gear is mated with one of the one or more sun gears; and (h) one or more planet gears each with a planet gear axis of rotation and a planet gear pitch radius, wherein (1) each knife roll has attached thereto at least one planet gear, (2) each planet gear is mated with one of the one or more idler gears that, together with one of the one or more sun gears, forms a gear train wherein the sun gear drives the idler gear which in turn drives the planet gear, and (3) the planet gear axis of rotation of each planet gear is concentric with the axis of rotation of the knife roll to which the planet gear is attached.

By way of example only, specific embodiments of the invention will now be described, with reference to the accompanying drawings.

DESCRIPTION OF THE DRAWINGS

FIG. 1(*b*) is an elevation view of an embodiment of a prior art cutting assembly wherein the support structure 5 is omitted for clarity;

FIG. 3(*b*) is a perspective view of an embodiment of the present invention;

FIG. 4(*b*) is an elevation view of an embodiment of the present invention;

FIG. 5(*b*) is a posterior perspective view of an embodiment of the present invention;

FIG. 6(*b*) is an elevation view of an embodiment of the present invention;

FIG. 8(*b*) is an elevation view of an embodiment of the present invention;

FIG. 8(*c*) is an elevation view of an embodiment of the present invention.

DETAILED DESCRIPTION OF THE PREFERRED EMBODIMENTS

Figure 1A:
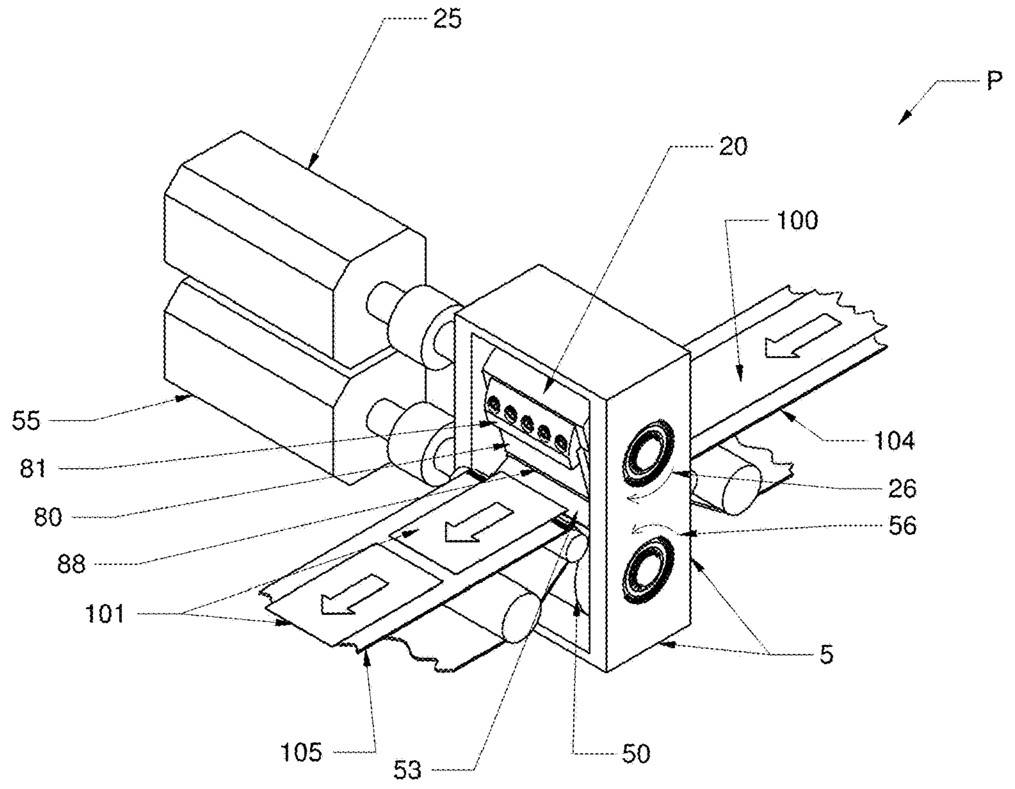
Figure 1(a) PRIOR ART
FIG. 1(*a*) is a perspective view of an embodiment of a prior art cutting assembly.
Figure 1B:
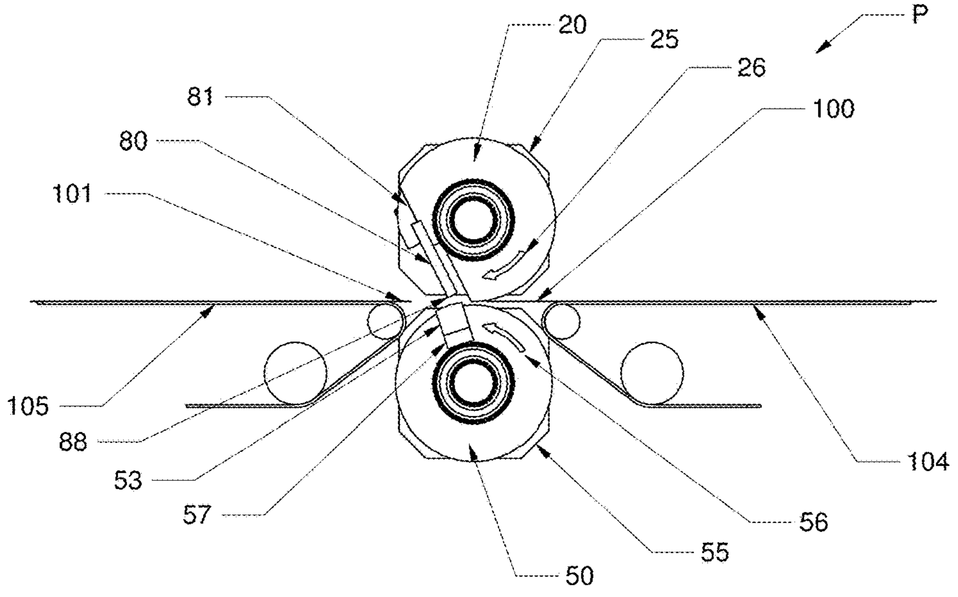
Figure 1(b) PRIOR ART
Figure 2:
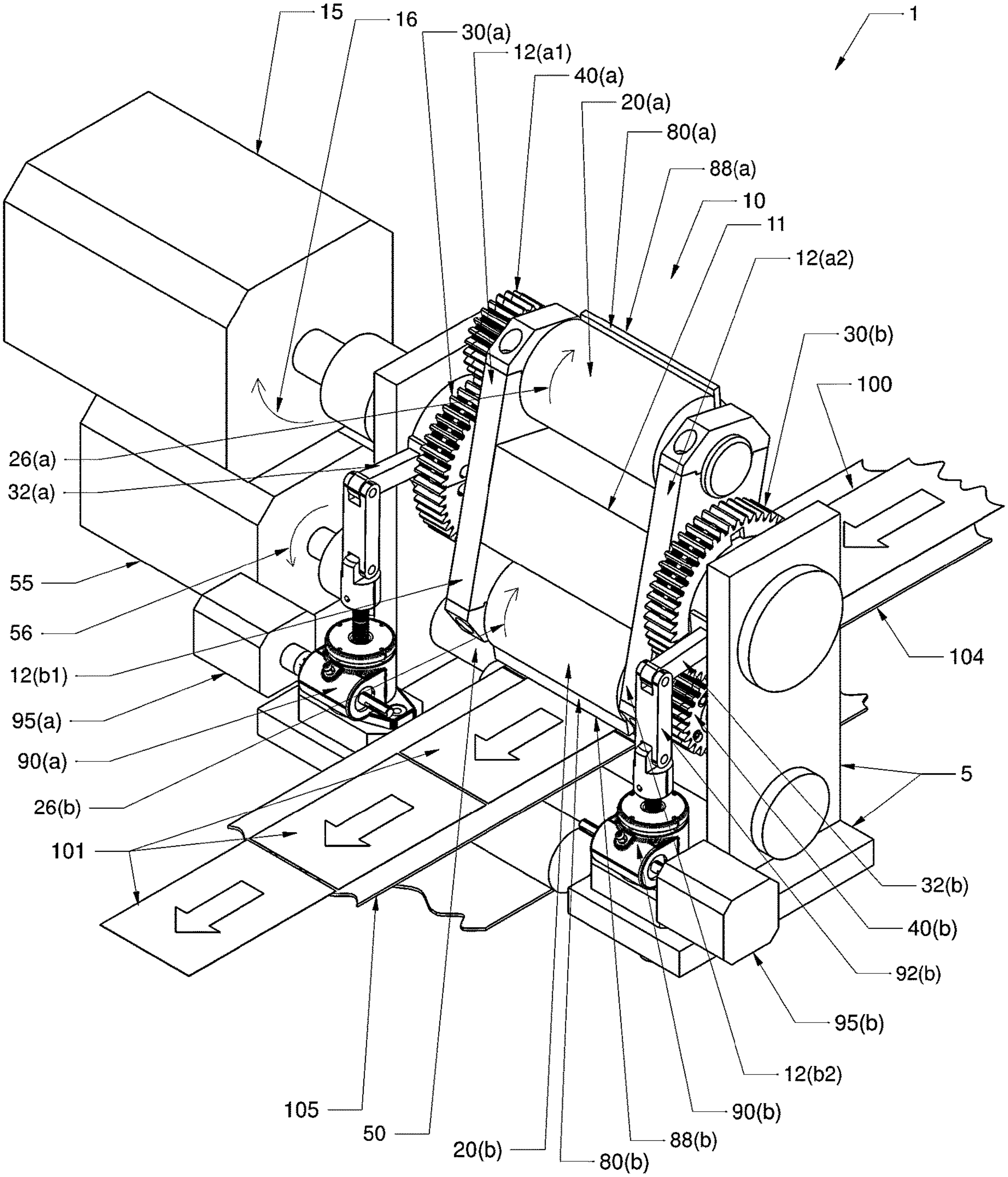
FIG. 2 is a perspective view of an embodiment of the present invention.
Figure 3A:
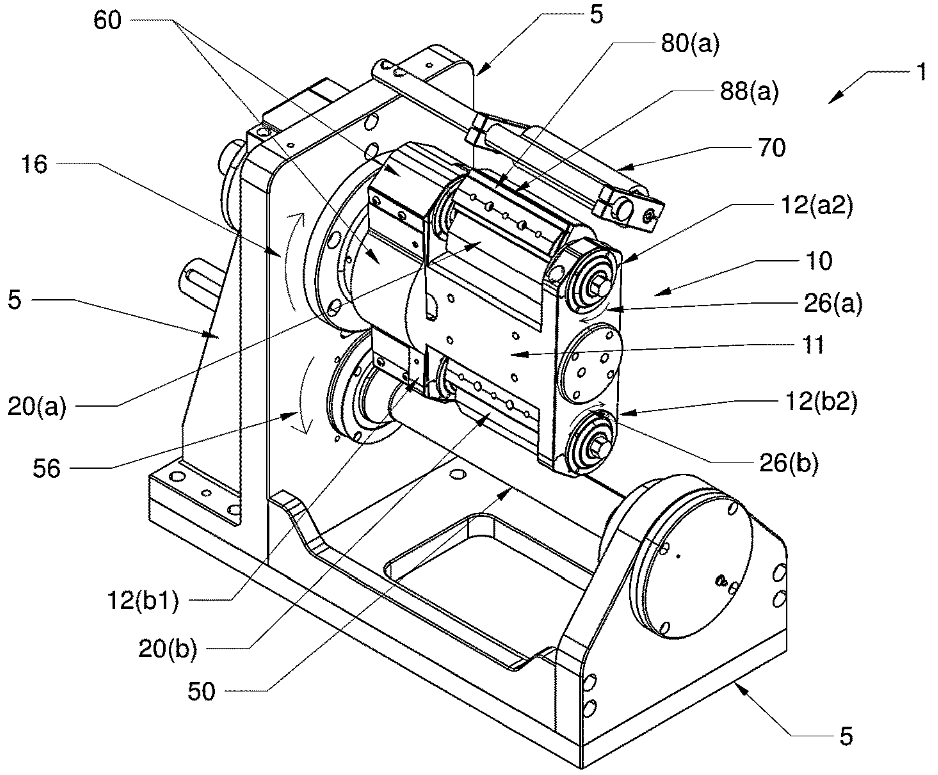
FIG. 3(*a*) is a perspective view of an embodiment of the present invention.
Figure 3B:
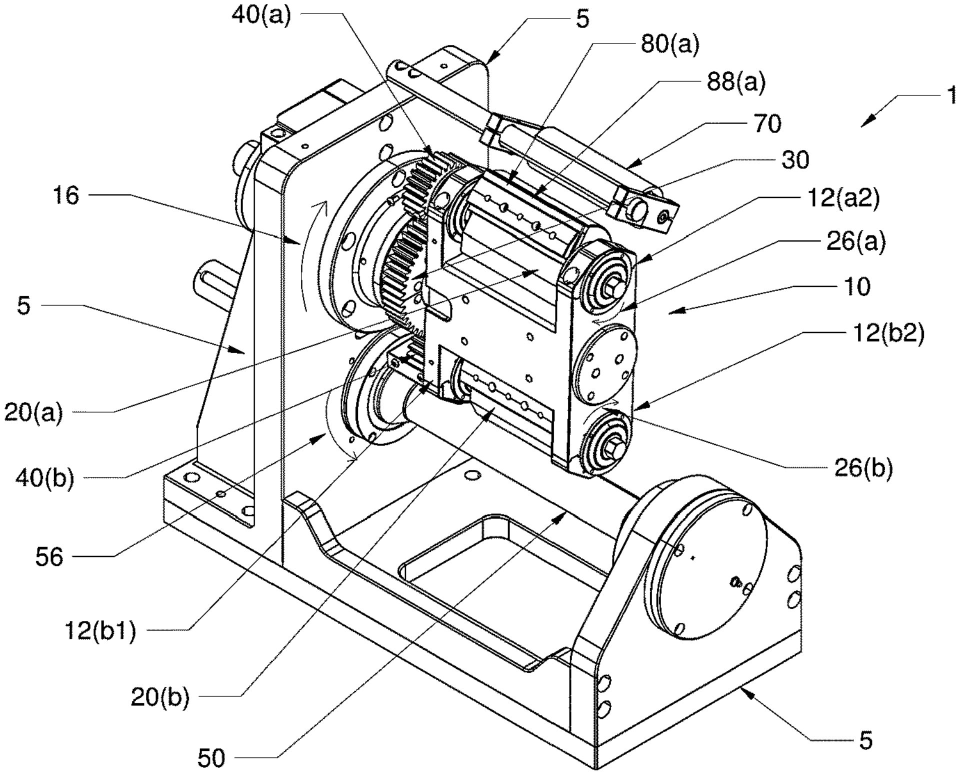

With reference to FIGS. 2, 3(*a*), and 3(*b*), an embodiment of the present invention comprises an orbital knife 1 comprising (a) a support structure 5, and (b) a yoke 10 rotatably attached to the support structure 5 with a yoke axis of rotation 16 and having a yoke hub 11 substantially concentric with yoke axis of rotation 16 and one or more yoke arms 12 positioned laterally with respect to and attached to the yoke hub 11.

Orbital knife 1 further comprises one or more knife rolls 20 radially displaced from and parallel to yoke hub 11, each of the one or more knife rolls 20 having its own axis of rotation 26. Each of the one or more knife rolls 20 is securely connected to a plurality of yoke arms 12 of yoke 10 using means known in the art, such as a protrusion extending from each end of a knife roll 20 extending through an aperture in yoke arm 12 of yoke 10. In preferred embodiments, orbital knife 1 comprises a plurality of knife rolls 20, more preferably plurality of knife rolls 20 comprises (a) a first knife roll 20(*a*) securely connected to yoke 10 via first knife roll first yoke arm 12(*a*1) and first knife roll second yoke arm 12(*a*2) spaced apart from first knife roll first yoke arm 12(*a*1) and (b) a second knife roll 20(*b*) securely connected to yoke 10 via second knife roll first yoke arm 12(*b*1) and second knife roll second yoke arm 12(*b*2) spaced apart from second knife roll first yoke arm 12(*b*1). First knife roll first yoke arm 12(*a*1) can be attached to, integral with, or separate from second knife roll first yoke arm 12(*b*1) and first knife roll second yoke arm 12(*a*2) can be attached to, integral with, or separate from second knife roll second yoke arm 12(*b*2). Yoke arms 12 are positioned so that the knife roll axis of rotation 26 is parallel to the yoke axis of rotation 16.

Further with reference to FIGS. 2, 3(*a*), and 3(*b*), a preferred embodiment of the present invention comprising orbital knife 1 further comprises one or more sun gears 30 rotatably attached to support structure 5 and having an axis of rotation concentric with the yoke rotational axis 16 and having a pitch radius (often referred to as a pitch circle, and which is equal to the distance from the center of the gear to the pitch point, the pitch point in turn being the point of tangency of the pitch circles of a pair of mating gears) such that the sun gear 30 pitch diameter (i.e., the diameter of the pitch circle) of each of the one or more sun gears 30 is concentric with rotational axis 16 of yoke 10. In preferred embodiments, orbital knife 1 comprises a plurality of sun gears 30, more preferably a pair of sun gears 30 comprising a first sun gear 30(*a*) and a second sun gear 30(*b*).

Further with reference to FIGS. 2, 3(*a*), and 3(*b*), an embodiment of the present invention of orbital knife 1 further comprises one or more blades 80 with an upper end and a lower end wherein blade 80 is separably attached to each of the one or more knife rolls 20 at its upper end. Each blade 80 comprises a cutting element 88 formed on lower end of blade 80 and positioned parallel to the knife roll 20 to which the blade 80 is separably attached.

An embodiment of the present invention of orbital knife 1 further comprises an anvil roll 50 rotatably connected to support structure 5, wherein anvil roll 50 has an axis of rotation 56 parallel to rotational axis 16 of yoke 10. In preferred embodiments of the present invention, orbital knife 1 further comprises one or more oiler rolls 70, wherein each oiler roll 70 (1) is preferably comprised of an absorbent material and (2) receives a slow feed of oil or other lubricating liquid from an oil or liquid reservoir. When a knife roll 20 is proximal the one or more oiler roll 70 by virtue of rotation of yoke 10, the cutting element 88 of blade 80 attached to knife roll 20 contacts oiler roll 70 and a thin coating of oil or other lubricating liquid from oiler roll 70 transfers to cutting element 88 each time knife roll 20 passes oiler roll 70. The lubrication of cutting element 88 of blade 80 improves long-term operation and lifespan of such structures buy reducing wear of the cutting element 88 of blade 80 when it contacts anvil roll 50.

In preferred embodiments of orbital knife 1 comprising a plurality of knife rolls 20(*a*) and 20(*b*), first knife roll 20(*a*) has separably attached thereto first blade 80(*a*) comprising first blade cutting element 88(*a*) and second knife roll 20(*b*) has separably attached thereto second blade 80(*b*) comprising second blade cutting element 88(*b*). In preferred embodiments of orbital knife 1 comprising a plurality of knife rolls 20(*a*) and 20(*b*) and a rotating yoke 10, web 100 is compressed alternatively between knife rolls 20(*a*) and 20(*b*) depending on the rotational position of yoke 10, and anvil roll 50, with web 100 cut into individual cut web pieces 101 alternatively by blade 80(*a*) attached to knife roll 20(*a*) when rotation of yoke 10 results in the positioning of knife roll 20(*a*) proximal anvil roll 50 and blade 80(*b*) attached to knife roll 20(*b*) when rotation of yoke 10 results in the positioning of knife roll 20(*b*) proximal anvil roll 50. Web 100 may or may not be in contact with knife roll 20 to effectuate a cut, with all that is required to effectuate a cut is contact between cutting element 88 of blade 80 and web 100.

Further with reference to FIGS. 2, 3(*a*), and 3(*b*), an embodiment of the present invention of orbital knife 1 further comprises one or more planet gears 40, each of which is rigidly or fixedly attached to one of the one or more knife rolls 20. Further, each planet gear 40 mates [i.e., in mesh contact] with a sun gear 30 whereby rotation of sun gear 30 effectuates rotation of planet gear 40; that is, sun gear 30 and planet gear 40 comprise a gear train whereby sun gear 30 is the driving gear and planet gear 40 is the driven gear. In embodiments of orbital knife 1 comprising a plurality of knife rolls 20(*a*) and 20(*b*), a first planet gear 40(*a*) is rigidly or fixedly attached to first knife roll 20(*a*) and mates with a first sun gear 30(*a*), and a second planet gear 40(*b*) is rigidly or fixedly attached to second knife roll 20(*b*) and mates with a second sun gear 30(*b*).

Each planet gear 40 has (a) an axis of rotation concentric with the axis of rotation 26 of the respective knife roll 20

(i.e., the knife roll 20 to which each planet gear 40 is attached; as shown in FIG. 2, knife roll 20(*a*) has axis of rotation 26(*a*) and knife roll 20(*b*) has axis of rotation 26(*b*)) and (b) a pitch radius substantially tangential to the pitch radius of the sun gear 30 with which the planet gear 40 mates so that rotation of yoke 10 about its axis of rotation 16 while a sun gear 30 is held stationary with respect to the support structure 5 will effectuate a rotation of the associated planet gear 40 and its respective knife roll 20 about its axis of rotation 26 [in FIG. 3, axes of rotation 26(*a*) and 26(*b*) for knife rolls 20(*a*) and 20(*b*), respectively]. Moreover, the ratio of the sun gear 30 pitch radii to the planet gear 40 pitch radii is established using any means known in the art such that operation of orbital knife 1 produces a precise repeating pattern of the positioning of the cutting element 88 associated with each knife roll 20 with respect to the support structure 5, which obviates cutting element 88 of blade 80 attached to knife roll 20 impinging or contacting anvil roll 50 during yoke 10 rotation.

In select embodiments of the present invention, yoke 10 may be directly connected to a drive motor 15 (FIGS. 2, 3(*a*), and 3(*b*)) to effectuate rotation of yoke 10 about its rotational axis 16. Alternatively, rotation of yoke 10 about its rotational axis 16 may be effectuated by any suitable means known in the art causing rotation of yoke 10. Moreover, in select embodiments of the present invention, anvil roll 50 may be connected to a drive motor 55 (see FIGS. 2, 3(*a*), and 3(*b*)) to effectuate rotation of anvil roll 50 about its rotational axis 56. Alternatively, rotation of anvil roll 50 may be effectuated by any suitable means known in the art causing controlled rotation of anvil roll 50.

Figure 4A:
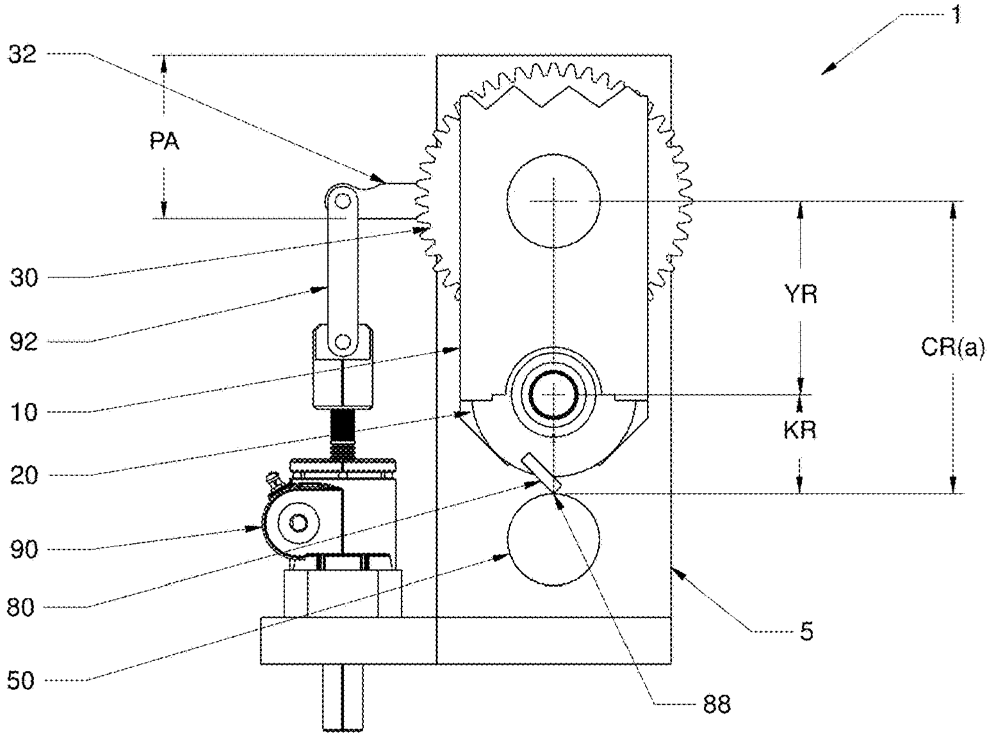
FIG. 4(*a*) is an elevation view of an embodiment of the present invention.
Figure 4B:
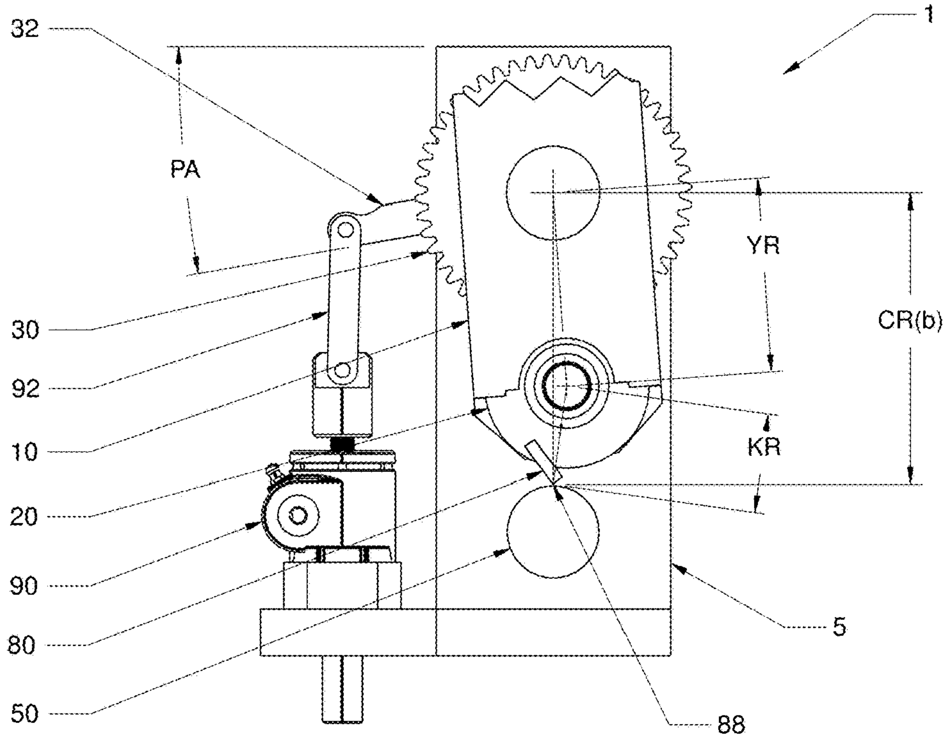

Further, orbital knife 1 has, for a particular cut setting, a key operational parameter called the cut radius CR [depicted as CR(a) in FIG. 4(*a*) and CR(b) in FIG. 4(*b*)] which is defined as the straight-line distance from the center of rotation of yoke 10 to cutting element 88 at the point in yoke rotation where the yoke center, the cutting element, and the anvil center lie in a common plane. The orientation of sun gear 30-planet gear 40, wherein sun gear 30 drives planet gear 40, allows for modification of the cut radius CR during operations of orbital knife 1. Further, [[with]] each knife roll 20 of the orbital knife 1 according to the present invention having associated therewith a sun gear 30 that is not associated with any other knife roll 20 allows for independent adjustment of each knife roll 20's cut radius CR.

The force required to effectuate the rotation of sun gear 30 can be achieved using any means known in the art. In preferred embodiments, orbital knife 1 comprises one or more phasing actuators 90 [depicted in FIG. 2 as a plurality of phasing actuators 90(*a*) and 90(*b*)] with an upper section and a lower section wherein the lower section is attached to support structure 5 of orbital knife 1 and a phasing link 92 is disposed at the upper section of actuator 90. Each phasing actuator 90 produce a linear motion which is converted to a rotational motion by its respective phasing link 92.

In preferred embodiments, orbital knife 1 further comprises a phasing arm 32 attached to each of the one or more sun gears 30, each phasing arm 32 having a first end and a second end, wherein (a) the first end of phasing arm 32 is rotatably attached to phasing link 92 and the second end of phasing arm 32 is rigidly attached to sun gear 30, and (b) rotation of phasing arm 32 effectuates rotation of sun gear 30 about its axis of rotation thereby controlling another key operational parameter called the phase angle PA [see FIGS. 4(*a*) and 4(*b*)] which is a measure of the amount of rotation of sun gear 30 relative to a fixed reference and wherein phase angle PA for the instant invention is defined as the angle from the upper lateral plane of support structure 5 to the lateral plane occupied by phasing arm 32 extending through the center of sun gear 30.

In preferred embodiments of the present invention of orbital knife 1 comprising a plurality of sun gears 30(*a*) and 30(*b*), rigidly attached to sun gear 30(*a*) is phasing arm 32(*a*) and rigidly attached to sun gear 30(*b*) is phasing arm 32(*b*). Force is provided by one or more actuator motors 95 connected to one or more actuators 90, with each motor 95 connected to one actuator 90. In alternative preferred embodiments as shown in FIG. 2, orbital knife 1 comprises a plurality of actuators 90(*a*) and 90(*b*) wherein each such actuator 90 is connected to a plurality of actuator motors 95(*a*) and 95(*b*).

The rotation of the one or more sun gears 30 allows for operational control of phase angle PA of each of the sun gears 30, with in-operation (on the fly) rotation of the one or more sun gears 30 (that is, rotation of the one or more sun gears 30 during active (ongoing) web 100 cutting operations, with such rotation driving planet gear 40, allowing for a change of the cut radius CR of each of the one or more blades 80 resulting in a modification of deflection of cutting element 88 associated with each of the one or more blades 80 attached to each of the one or more knife rolls 20 associated with each such rotating sun gear 30, thus obviating use of an adjustable anvil 53 in prior art cutting apparatus P and adjustment of such anvil 53 to effectuate a change in blade deflection and resulting in an apparatus (i.e., orbital knife 1) that has less parts and is less expensive to acquire and maintain than prior art cutting apparatuses P. In other words, the rotation of sun gear 30 according to the present invention allows a user of orbital knife 1 to change the cut radius CR, and hence blade deflection and the cutting force with which cutting element 88 on blade 80 contacts anvil roll 50, of each of the one or more blades 80 on the fly during operations to allow for a continuous cutting operation during which the optimal blade 80 deflection is maintained without the need for multiple batch (run) operations (i.e., operation of prior art cutting apparatus P with a first cut radius CR, stoppage of operation [defining a first batch {run} operation], modification of prior art cutting apparatus P by adjusting the position of cutting element 88 of blade 80 relative to the center of rotation of the knife roll 20 to effectuate a change of cut radius CR and hence effectuating a change in the blade 80 deflection during the cutting operation or, alternatively, changing the deflection of the blade 80 of cutting apparatus P by changing the position of the anvil 53 relative to the center of rotation of the anvil roll 50 to effectuate a change in the deflection of blade 80 with cutting element 88, with any of the foregoing requiring the aforementioned stoppage of operations of cutting apparatus P to change cutting element 88 deflection and thereafter recommencing operations of cutting apparatus P [defining a second batch {run} operation]). The on-the-fly CR adjustability provided by orbital knife 1 according to the present invention allows for optimal blade interference to make web 100 cutting operations more efficient.

In a cutting operation, cut radius CR is at a maximum when yoke radius YR, which is defined as the straight-line distance from the yoke axis of rotation 16 to the knife roll axis of rotation 26, and the knife radius KR, another key operational parameter defined as the straight-line distance from the knife roll axis of rotation 26 to cutting element 88 of blade 80 of knife roll 20, lie in a common plane as illustrated in FIG. 4(*a*). Moving the knife roll axis of rotation 26 out of the common plane will cause a reduction of cut radius CR as illustrated in FIG. 4(*b*) and is effectuated by rotation of sun gear 30. In practice, the optimal cut radius CR for any given circumstance is something less than the maximum cut radius CR. Further, the optimal blade 80 deflection with related cut radius CR may change over time depending on operating conditions. In the present invention, maintenance of an optimal blade deflection and associated cut radius CR can be achieved since cut radius CR of each of the one or more blades 80 of orbital knife 1 can be varied during web cutting operation without stopping orbital knife 1 operations as is required of a prior art cutting apparatus P.

During operation of orbital knife 1 with one or more knife rolls 20 on which is attached a blade 80 with cutting element 88, yoke 10 rotates about its axis of rotation 16, and anvil roll 50 rotates about its axis of rotation 56. In preferred embodiments comprising an actuator 90-phasing link 92-phasing arm 32 arrangement as described herein, rotation of one or more sun gears 30 results from the displacement of a phasing link 92 associated with each sun gear 30, with such displacement of phasing link 92 in preferred embodiments effectuated by actuator 90. Phasing link 92 displacement effectuates displacement of phasing arm 32, which in turn effectuates rotation of the associated sun gear 30. Rotation of the sun gear 30 results in the rotation of the planet gear 40 with which the sun gear 30 is in mesh contact forming a gear train. Sun gear 30 rotation effectuates a rotation of the associated knife roll 20 about such knife roll 20's axis of rotation 26, thereby changing the relationship between the yoke radius YR and the knife radius KR with a corresponding change in the cut radius CR and therefore changing blade 80 deflection.

Web 100 passes through orbital knife 1 on the conveyor comprising two segments, being fed to orbital knife 1 by being disposed on infeed conveyor 104 which is spaced apart from discharge conveyor 105, resulting in a gap between conveyor segments 104 and 105. In the gap, web 100 is disposed on anvil roll 50 positioned below web 100. Rotation of yoke 10 about its axis of rotation 16 results in the positioning of knife roll 20 proximal anvil roll 50 and cutting element 88 of blade 80 attached to knife roll 20 being positioned above web 100 in this gap, with cutting element 88 positioned above and in contact with web 100 which in turn is positioned above and in contact with anvil roll 50. A load (force) is imposed on anvil roll 50 by the blade 80 of knife roll 20 which compresses web 100 in this gap, with web 100 cut into individual cut web pieces 101 by blade 80 of knife roll 20 when rotation of yoke 10 results in the positioning of knife roll 20 proximal anvil roll 50.

Figure 5A:
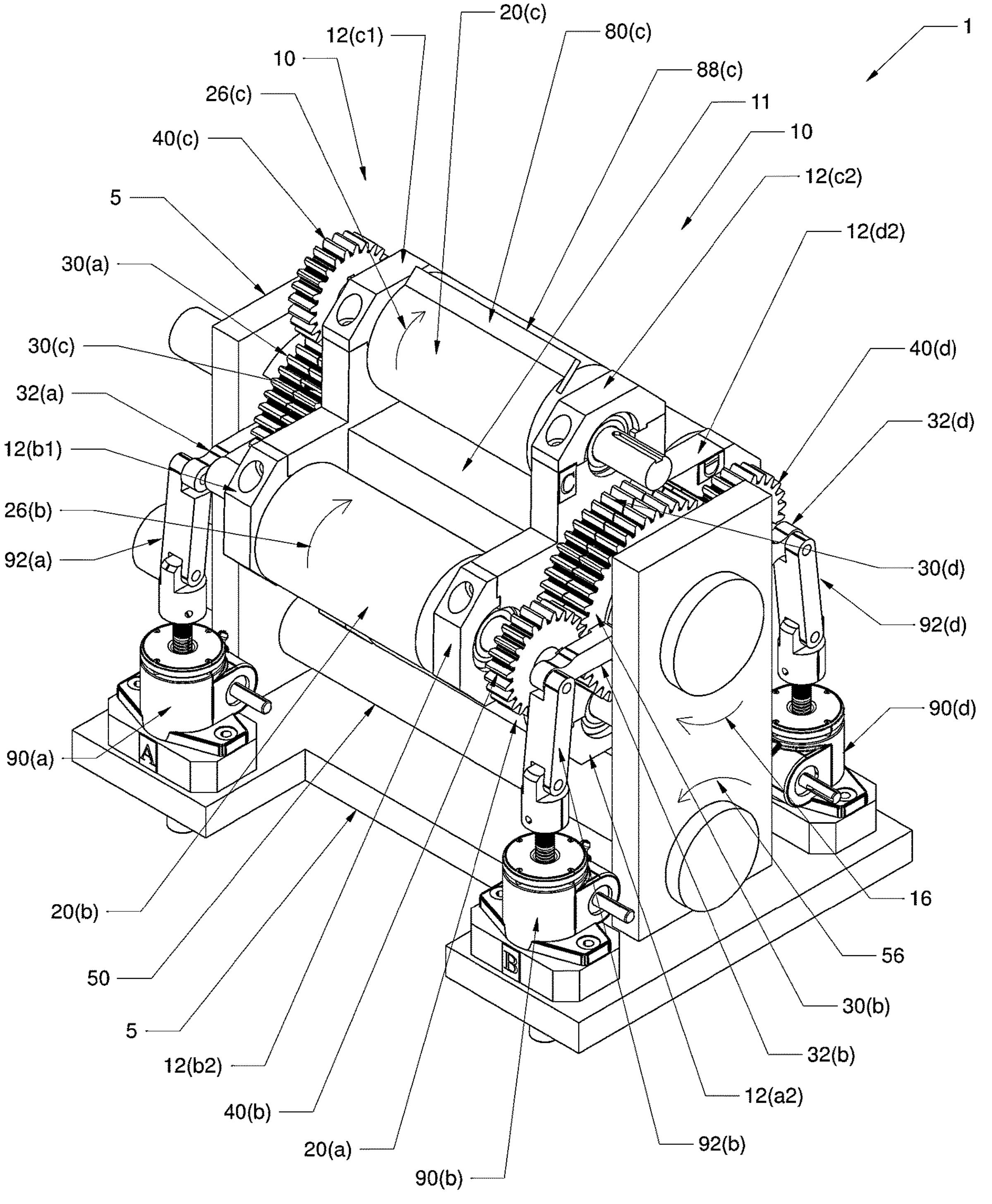
FIG. 5(*a*) is an anterior perspective view of an embodiment of the present invention.
Figure 5B:
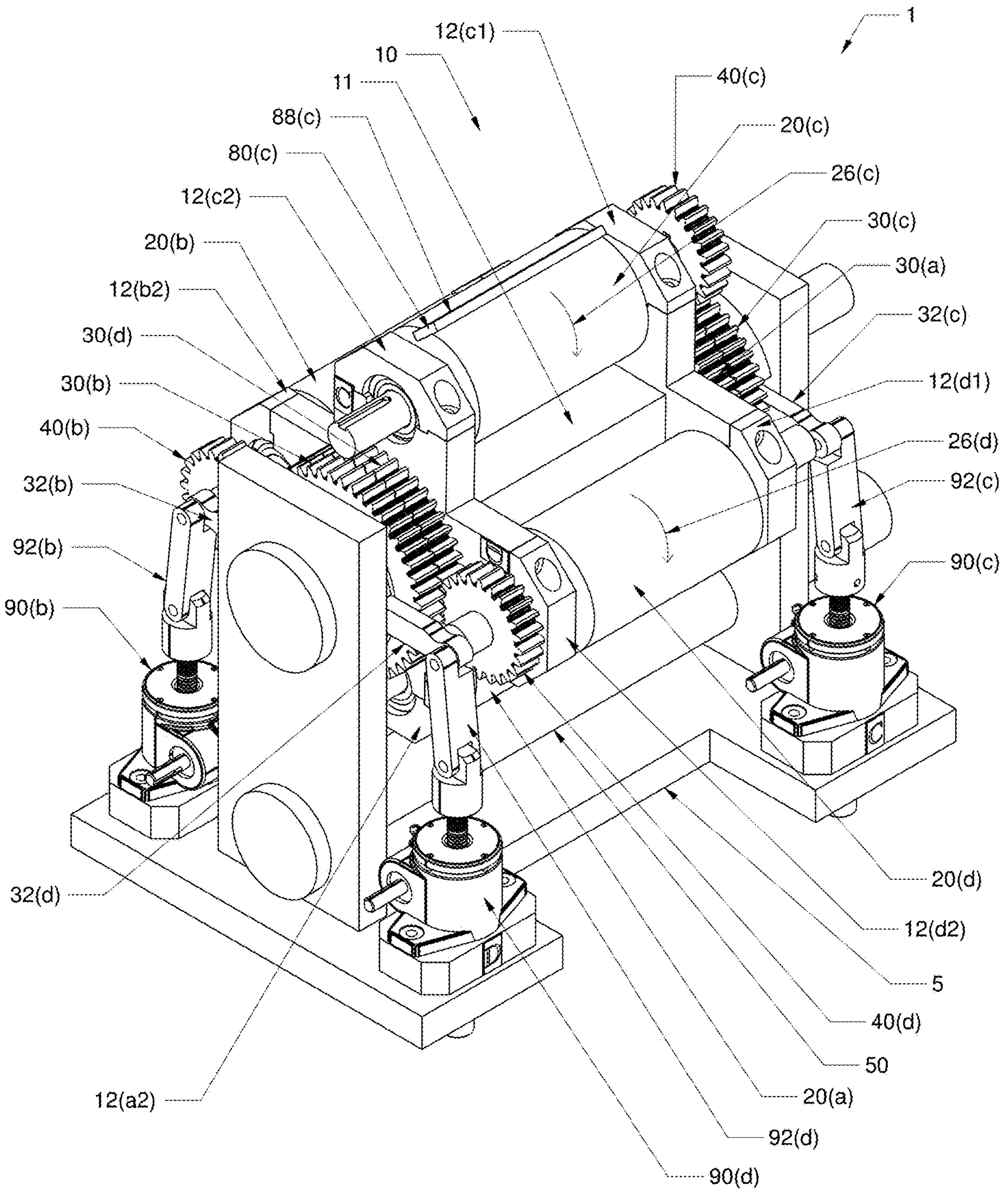
Figure 6A:
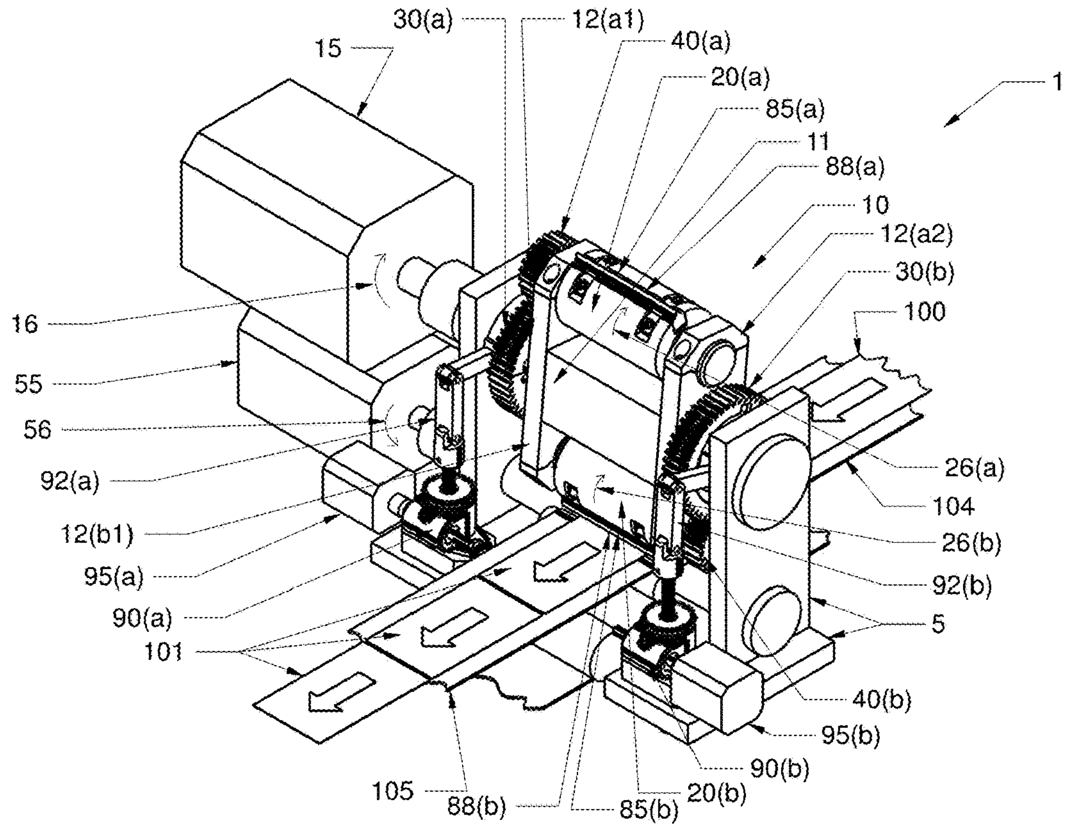
FIG. 6(*a*) is a perspective view of an embodiment of the present invention.
Figure 6B:
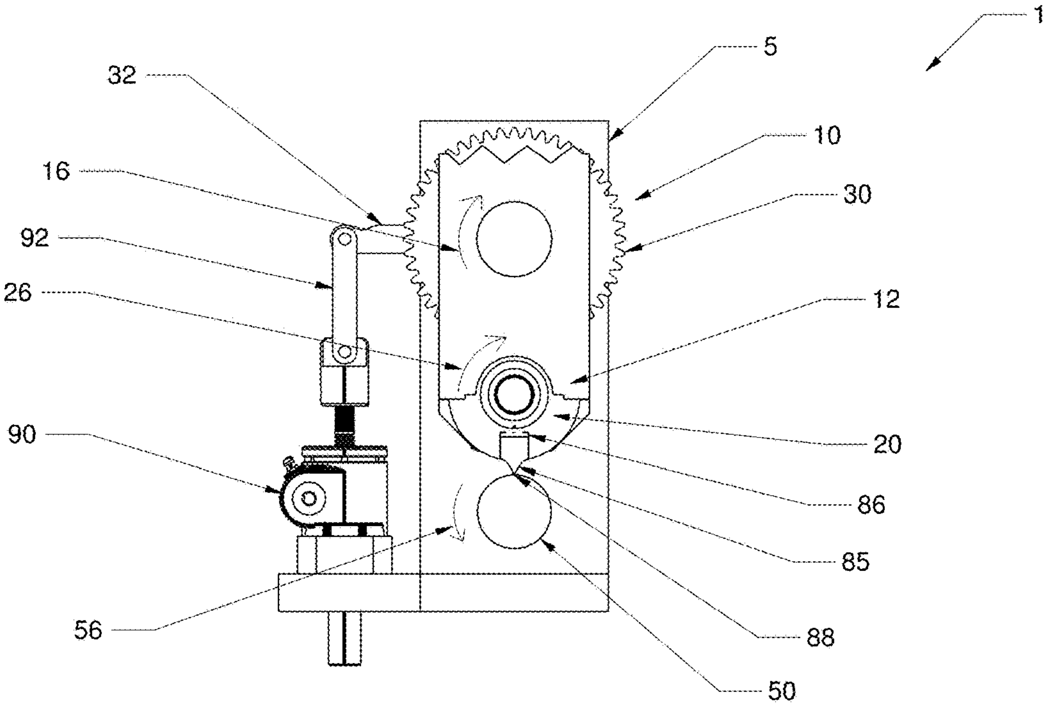

In alternative embodiments of the present invention depicted in FIGS. 5(*a*)/5(*b*) and 6(*a*), orbital knife 1 comprises (a) a support structure 5, and (b) a yoke 10 rotatably attached to the support structure 5 with a yoke axis of rotation 16 and having a yoke hub 11 substantially concentric with yoke axis of rotation 16 and a plurality of yoke arms 12 [in the embodiment depicted in FIGS. 5(*a*)/5(*b*): 12(*a*1) and 12(*a*2); 12(*b*1) and 12(*b*2); 12(*c*1) and 12(*c*2); 12(*d*1) and 12(*d*2); in FIGS. 6(*a*): 12(*a*1) and 12(*a*2); and 12(*b*1) and 12(*b*2)] positioned laterally with respect to and attached to the yoke hub 11.

Orbital knife 1 further comprises a plurality of knife rolls 20 [in the embodiment depicted in FIGS. 5(*a*)/5(*b*): 20(*a*), 20(*b*), 20(*c*), and 20(*d*); in the embodiment depicted in FIGS. 6(*a*): 20(*a*) and 20(*b*)]. Each of the plurality of knife rolls 20 is supported by an associated pair of yoke arms 12. For example, with reference to FIGS. 5(*a*) and 5(*b*), knife roll 20(*c*) is rotatably attached to and supported by yoke arms 12(*c*1) and 12(*c*2). Each of the remaining knife rolls 20 of the plurality of knife rolls 20 [20(*a*), 20(*b*), and 20(*d*)] is similarly rotatably attached to and supported by its associated pair of yoke arms 12 [12(*a*1) and 12(*a*2), 12(*b*1) and 12(*b*2), and 12(*d*1) and 12(*d*2)]. And, for example, with reference to FIG. 6(*a*), knife roll 20(*a*) is rotatably attached to and supported by yoke arms 12(*a*1) and 12(*a*2) and knife roll 20(*b*) is rotatably attached to and supported by yoke arms 12(*b*1) and 12(*b*2). Yoke arms 12 are positioned so that the knife roll axis of rotation 26 is parallel to the yoke axis of rotation 16.

Moreover, each of the plurality of knife rolls 20 has its own associated planet gear 40 and associated sun gear 30. For example, with respect to the embodiment depicted in FIGS. 5(*a*)/5(*b*), knife roll 20(*a*) has rigidly attached to it planet gear 40(*a*) in mated contact with sun gear 30(*a*), knife roll 20(*b*) has rigidly attached to it planet gear 40(*b*) in mated contact with sun gear 30(*b*), knife roll 20(*c*) has rigidly attached to it planet gear 40(*c*) in mated contact with sun gear 30(*c*), and knife roll 20(*d*) has rigidly attached to it planet gear 40(*d*) in mated contact with sun gear 30(*d*). For example, with respect to the embodiment depicted in FIG. 6(*a*), knife roll 20(*a*) has rigidly attached to it planet gear 40(*a*) in mated contact with sun gear 30(*a*), and knife roll 20(*b*) has rigidly attached to it planet gear 40(*b*) in mated contact with sun gear 30(*b*).

Each of the one or more sun gears 30 is rotatably attached to support structure 5 and has an axis of rotation concentric with yoke rotational axis 16 and a pitch radius such that sun gear 30 pitch diameter is concentric with rotational axis 16 of yoke 10. Each of the one or more planet gears 40 is rigidly or fixedly attached to each of the one or more knife rolls 20, with each of the one or more planet gears 40 (*i*) in mated contact with one of the one or more sun gears 30 whereby rotation of sun gear 30 effectuates rotation of planet gear 40, (ii) having an axis of rotation concentric with the axis of rotation 26 of the respective knife roll 20 to which such planet gear 40 is attached, and (iii) having a pitch radius substantially tangential to the pitch radius of the sun gear 30 with which the planet gear 40 mates so that rotation of yoke 10 about its axis of rotation 16 while sun gear 30 is held stationary with respect to the support structure 5 which will effectuate a rotation of the associated planet gear 40 and its respective knife roll 20 about its axis of rotation 26.

Further, in such embodiment of the present invention of orbital knife 1 and with reference to FIGS. 5(*a*) and 5(*b*), each knife roll 20 has separably attached thereto a blade 80 [FIGS. 5(*a*)/5(*b*)] or blade 85 [FIG. 6(*a*)] comprising a cutting element 88 positioned parallel to the knife roll 20 to which the blade 80 or 85 is separably attached [in the embodiment shown in FIGS. 5(*a*) and 5(*b*), blade 80(*a*) comprising cutting element 88(*a*) is attached to knife roll 20(*a*), blade 80(*b*) comprising cutting element 88(*b*) is attached to knife roll 20(*b*), blade 80(*c*) comprising cutting element 88(*c*) is attached to knife roll 20(*c*), and blade 80(*d*) comprising cutting element 88(*d*) is attached to knife roll 20(*d*); in the embodiment shown in FIG. 6(*a*), blade 85(*a*) comprising cutting element 88(*a*) is attached to knife roll 20(*a*), and blade 85(*b*) comprising cutting element 88(*b*) is attached to knife roll 20(*b*)]. By having a plurality of knife rolls 20, each cut radius CR associated with each of the plurality of cutting elements 88 can be independently controlled or set, which is not possible with prior art cutting apparatuses, with each of the plurality of knife rolls 20 capable of having a cut radius CR distinct from any other one or more knife rolls 20 with cut radius or radii CR, as the case may be. Accordingly, the cut radius CR associated with each of the plurality of separate cutting elements 88 may be altered independently from any other cutting element 88.

The orientation of sun gear 30-planet gear 40, wherein sun gear 30 drives planet gear 40, allows for modification of the cut radius CR during operations of orbital knife 1. Further, with each knife roll 20 of the orbital knife 1 according to the present invention having associated therewith a sun gear 30 that is not associated with any other knife roll 20 allows for independent adjustment of each knife roll 20's cut radius CR.

Such embodiment of the present invention of orbital knife 1 further comprises an anvil roll 50 rotatably connected to support structure 5, wherein anvil roll 50 has an axis of rotation 56 parallel to rotational axis 16 of yoke 10. In such embodiment of the present invention of orbital knife 1, web 100 is compressed between anvil roll 50, with which it is in contact in the gap separating conveyor segments 104 and 105, and alternatively between knife rolls 20 [embodiment in FIGS. 5(*a*)/5(*b*): 20(*a*), 20(*b*), 20(*c*), and 20(*d*); embodiment in FIGS. 6(*a*): 20(*a*) and 20(*b*)] depending on the rotational position of yoke 10 and anvil roll 50, with web 100 cut into individual cut web pieces 101 alternatively by the blades 80 depicted in FIGS. 5(*a*)/5(*b*) or blades 85 depicted in FIGS. 6(*a*)/(b) on the different knife rolls 20. By way of example and with reference to the embodiment depicted in FIGS. 5(*a*)/5(*b*), web 100 is cut when (i) blade 80(*a*) attached to knife roll 20(*a*) when rotation of yoke 10 results in the positioning of knife roll 20(*a*) proximal anvil roll 50, (ii) blade 80(*b*) attached to knife roll 20(*b*) when rotation of yoke 10 results in the positioning of knife roll 20(*b*) proximal anvil roll 50, (iii) blade 80(*c*) attached to knife roll 20(*c*) when rotation of yoke 10 results in the positioning of knife roll 20(*c*) proximal anvil roll 50, and (iv) blade 80(*d*) attached to knife roll 20(*d*) when rotation of yoke 10 results in the positioning of knife roll 20(*d*) proximal anvil roll 50. Web 100 may or may not be in contact with knife roll 20 to effectuate a cut, with all that is required to effectuate a cut is contact between cutting element 88 of blade 80 and web 100.

Further, in such embodiment of the present invention of orbital knife 1, the ratio of sun gear 30 pitch radii to the planet gear 40 pitch radii (e.g., ratio of sun gear 30(*a*) pitch radius to planet gear 40(*a*) pitch radius, ratio of sun gear 30(*b*) pitch radius to planet gear 40(*b*) pitch radius [the foregoing for embodiments depicted in FIGS. 5(*a*)/5(*b*) and 6(*a*)], and, additionally for the embodiment depicted in FIGS. 5(*a*)/5(*b*), ratio of sun gear 30(*c*) pitch radius to planet gear 40(*c*) gear radius, and ratio of sun gear 30(*d*) pitch radius to planet gear 40(*d*) gear radius) for the plurality of sun gears 30 and planet gears 40 is established such that operation of orbital knife 1 produces a precise repeating pattern of the positioning of the cutting elements 88 [embodiment depicted in FIGS. 5(*a*)/5(*b*): cutting elements 88(*a*), 88(*b*), 88(*c*), and 88(*d*) of blades 80(*a*), 80(*b*), 80(*c*), and 80(*d*) attached to knife rolls 20(*a*), 20(*b*), 20(*c*), and 20(*d*), respectively; embodiment depicted in FIG. 6(*a*): cutting elements 88(*a*) and 88(*b*) of blades 85(*a*) and 85(*b*) attached to knife rolls 20(*a*) and 20(*b*), respectively] with respect to anvil roll 50 which obviates cutting element 88 contact with anvil roll 50 during yoke 10 rotation.

The force for rotation of yoke 10 and anvil roll 50 of this embodiment of the present invention of orbital knife 1 may be provided by any one of many known methods in the art. In preferred embodiments, orbital knife 1 further comprises a plurality of actuators 90 [actuators 90(*a*), 90(*b*), 90(*c*), and 90(*d*) in embodiment depicted in FIGS. 5(*a*) and 5(*b*) and actuators 90(*a*) and 90(*b*) in the embodiment depicted in FIG. 6(*a*)], each such actuator 90 with an upper section and a lower section, wherein the lower section is attached to support structure 5 and a phasing link 92 [phasing links 92(*a*), 92(*b*), 92(*c*), and 92(*d*) in the embodiment depicted in FIGS. 5(*a*)/5(*b*); phasing links 92(*a*) and 92(*b*) in the embodiment depicted in FIG. 6(*a*)] disposed at the upper section of actuators 90. Each phasing actuator 90 produces a linear motion which is converted to a rotational motion by its respective phasing link 92.

Orbital knife 1 according to such embodiment further comprises a plurality of phasing arms 32, each phasing arm 32 attached to one of the plurality of sun gears 30 [phasing arms 32(*a*), 32(*b*), 32(*c*), and 32(*d*) attached to sun gears 30(*a*), 30(*b*), 30(*c*), and 30(*d*), respectively, in the embodiment depicted in FIGS. 5(*a*)/5(*b*); phasing arms 32(*a*) and 32(*b*) attached to sun gears 30(*a*) and 30(*b*), respectively, in the embodiment depicted in FIG. 6(*a*)]. Each such phasing arm 32 has a first end and a second end, wherein the first end is rotatably attached to phasing link 92 and the second end is rigidly attached to sun gear 30. Rotation of a phasing arm 32 effectuates rotation of the associated sun gear 30 about such sun gear 30's axis of rotation thereby controlling the phase angle PA of each such sun gear 30.

Further, in preferred select embodiments of orbital knife 1 according to this embodiment of the present invention where force for rotation of sun gears 30 is provided through actuator 90, orbital knife 1 further comprises a plurality of actuator motors 95 [actuator motors 95(*a*), 95(*b*), 95(*c*), and 95(*d*) in the embodiment depicted in FIGS. 5(*a*)/5(*b*) and 95(*a*) and 95(*b*) in the embodiment depicted in FIG. 6(*a*)] wherein each actuator motor 95 is attached to one of the plurality of actuators 90 [actuators 90(*a*), 90(*b*), 90(*c*), and 90(*d*) in the embodiment depicted in FIGS. 5(*a*)/5(*b*); 90(*a*) and 90(*b*) in the embodiment depicted in FIG. 6(*a*)].

The rotation of plurality of sun gears 30 in the embodiments of orbital knife 1 depicted in FIGS. 5(*a*)/5(*b*) [30(*a*), 30(*b*), 30(*c*), and 30(*d*)] and 6(*a*) [30(*a*) and 30(*b*)] allows for operational control of the rotational position (i.e., the phase angle PA) of each of the sun gears 30, with in-operation (on the fly) rotation of the plurality of sun gears 30 (that is, rotation of the plurality of sun gears 30 during active (ongoing) web 100 cutting operations driving the plurality of planet gears 40 [in the embodiment depicted in FIGS. 5(*a*)/5(*b*): 40(*a*), 40(*b*), 40(*c*), and 40(*d*); in the embodiment depicted FIGS. 6(*a*): 40(*a*) and 40(*b*)]), allowing for a change of the cut radius CR of each of the blades 80 [FIGS. 5(*a*)/5(*b*)] and 85 [FIG. 6(*a*)] attached to the plurality of knife rolls 20 [in the embodiment depicted in FIGS. 5(*a*)/5(*b*): 80(*a*), 80(*b*), 80(*c*), and 80(*d*) attached to knife rolls 20(*a*), 20(*b*), 20(*c*), and 20(*d*), respectively; in the embodiment depicted in FIGS. 6(*a*): blades 85(*a*) and 85(*b*) attached to knife rolls 20(*a*) and 20(*b*), respectively] resulting in a modification of deflection of cutting elements 88 of blades 80 attached to knife rolls 20 associated with the sun gears 30 [in the embodiment depicted in FIGS. 5(*a*)/5(*b*): cutting element 88(*a*) of blade 80(*a*) attached to knife roll 20(*a*) associated with sun gear 30(*a*); cutting element 88(*b*) of blade 80(*b*) attached to knife roll 20(*b*) associated with sun gear 30(*b*); cutting element 88(*c*) of blade 80(*c*) attached to knife roll 20(*c*) associated with sun gear 30(*c*); and cutting element 88(*d*) of blade 80(*d*) attached to knife roll 20(*d*) associated with sun gear 30(*d*); in the embodiment depicted in FIGS. 6(*a*): cutting element 88(*a*) of blade 85(*a*) attached to knife roll 20(*a*) associated with sun gear 30(*a*); cutting element 88(*b*) of blade 85(*b*) attached to knife roll 20(*b*) associated with sun gear 30(*b*)], thus obviating use of an adjustable anvil 53 in prior art cutting apparatus P and adjustment of such anvil 53 to effectuate a change in blade deflection and resulting in an apparatus (i.e., orbital knife 1 according to the present invention) that has less parts and is less expensive to acquire and maintain than prior art cutting apparatuses P. In other words, the rotation of sun gears 30 according to the present invention allows a user of orbital knife 1 to change the cut radius CR, and hence blade defection and the cutting force with which cutting elements 88 on blades 80 and 85 contact anvil roll 50, of each of the blades 80 and 85 on the fly during operations to allow for a continuous cutting operation during which the optimal blade 80 deflection is maintained without the need for multiple batch (run) operations and without having to effectuate the manual adjustments required of prior art cutting apparatus P to effectuate a change in blade deflection. In other words, the rotation of the plurality of sun gears 30 [30(*a*) through 30(*d*) {FIGS. 5(*a*)/5(*b*)} or 30(*a*) and 30(*b*) {FIG. 6(*a*)}] according to the present invention allows a user of orbital knife 1 to change the cut radius CR, and hence blade deflection, of blades 80 and 85 on the fly during operations to allow for a continuous cutting operation during which the optimal blade 80 and 85 deflection is maintained without the need for multiple batch (run) operations (i.e., operation of prior art cutting apparatus P with a first cut radius CR, stoppage of operation [defining a first batch {run} operation], modification of prior art cutting apparatus P by adjusting the position of cutting elements 88 of blades 80 relative to the center of rotation of the knife rolls 20 to effectuate a change of cut radius CR and hence effectuating a change in the blade 80 deflection during the cutting operation or, alternatively, changing the deflection of the blade 80 of cutting apparatus P by changing the position of the anvil 53 relative to the center of rotation of the anvil roll 50 to effectuate a change in the deflection of blade 80 with cutting element 88, with any of the foregoing requiring the aforementioned stoppage of operations of cutting apparatus P to change cutting element 88 deflection and thereafter recommencing operations of cutting apparatus P [defining a second batch {run} operation]). The on-the-fly CR adjustability provided by orbital knife 1 according to the present invention allows for optimal blade interference to make web 100 cutting operations more efficient.

In a cutting operation with the present invention, cut radius CR is at a maximum when yoke radius YR, which is defined as the straight-line distance from the yoke axis of rotation 16 to the knife roll axis of rotation 26, and the knife radius KR, another key operational parameter defined as the straight-line distance from the knife roll axis of rotation 26 to each of the cutting elements 88 of blades 80 of knife rolls 20 lie in a common plane. Moving the knife roll axis of rotation 26 out of the common plane will cause a reduction of cut radius CR and is effectuated by rotation of sun gear 30. In practice, the optimal cut radius CR for any given circumstance is something less than the maximum cut radius CR. Further, the optimal blade 80 deflection with related cut radius CR may change over time depending on operating conditions. In the present invention, maintenance of an optimal blade deflection and associated optimal cut radius CR can be achieved since cut radius CR of each of the one or more blades 80 of orbital knife 1 can be varied during web cutting operation without stopping orbital knife 1 operations as is required of a prior art cutting apparatus P. The orientation of sun gear 30-planet gear 40, wherein sun gear 30 drives planet gear 40, allows for modification of the cut radius CR during operations of orbital knife 1. Further, with each knife roll 20 of the orbital knife 1 according to the present invention having associated therewith a sun gear 30 that is not associated with any other knife roll 20 allows for independent adjustment of each knife roll 20's cut radius CR.

During operation of orbital knife 1 with knife rolls 20(*a*), 20(*b*), 20(*c*), and 20(*d*) on which is attached blades 80(*a*), 80(*b*), 80(*c*), and 80(*d*) with cutting element 88(*a*), 88(*b*), 88(*c*), and 88(*d*), respectively, yoke 10 rotates about its axis of rotation 16, and anvil roll 50 rotates about its axis of rotation 56. In preferred embodiments comprising an actuator 90-phasing link 92-phasing arm 32 arrangement as described herein, rotation of sun gears 30 [in the embodiment depicted in FIGS. 5(*a*)/5(*b*): 30(*a*), 30(*b*), 30(*c*), and 30(*d*); in the embodiment depicted in FIGS. 6(*a*): 30(*a*) and 30(*b*)] results from the displacement of phasing links 92 associated with sun gears 30 [phasing links 92(*a*), 92(*b*), 92(*c*), and 92(*d*) in the embodiment depicted in FIGS. 5(*a*)/5(*b*); phasing links 92(*a*) and 92(*b*) in the embodiment depicted in FIG. 6(*a*)], with displacement of phasing links 92 effectuated by actuators 90 [actuators 90(*a*), 90(*b*), 90(*c*), and 90(*d*) in the embodiment depicted in FIGS. 5(*a*)/5(*b*); 90(*a*) and 90(*b*) in the embodiment depicted in FIG. 6(*a*)]. Phasing link displacement effectuates displacement of phasing arms 32 [phasing arms 32(*a*), 32(*b*), 32(*c*), and 32(*d*) in the embodiment depicted in FIGS. 5(*a*)/5(*b*); phasing arms 32(*a*) and 32(*b*) in the embodiment depicted in FIG. 6(*a*)], which in turn effectuates rotation of associated sun gears 30. Sun gear rotation results in rotation of planet gears 40 [in the embodiment depicted in FIGS. 5(*a*)/5(*b*): planet gears 40(*a*), 40(*b*), 40(*c*), and 40(*d*); in the embodiment depicted in FIG. 6(*a*): planet gears 40(*a*) and 40(*b*)] which are in mesh contact with sun gears 30, forming a plurality of gear trains. Rotation of sun gears 30 effectuates rotation of the associated knife rolls 20 about each such knife roll's axis of rotation 26 [in the embodiment depicted in FIGS. 5(*a*)/5(*b*): knife rolls 20(*a*), 20(*b*), 20(*c*), and 20(*d*) about axes of rotation 26(*a*), 26(*b*), 26(*c*), and 26(*d*), respectively; in the embodiment depicted in FIG. 6(*a*): knife rolls 20(*a*), 20(*b*) about axes of rotation 26(*a*) and 26(*b*), respectively].

Web 100 passes through orbital knife 1 on the conveyor comprising two segments, being fed to orbital knife 1 by being disposed on infeed conveyor 104 which is spaced apart from discharge conveyor 105, resulting in a gap between conveyor segments 104 and 105. In the gap, web 100 is disposed on anvil roll 50 positioned below web 100. The aforementioned rotation of knife rolls 20 about axes of rotation 26 results in the alternatively positioning of each of the plurality of knife rolls 20 proximal anvil roll 50 and each of cutting element 88 of blades 80 or 85 attached to knife rolls 20 being alternatively positioned above and in contact with web 100 in this gap, with web 100 in turn positioned above and in contact with anvil roll 50. A load (force) is imposed on anvil roll 50 alternatively by each of the plurality of blades 80 attached to each of the plurality of knife rolls 20 compresses web 100 in this gap, with web 100 cut into individual cut web pieces 101 alternatively by each of the plurality of blades 80 of each of the plurality of knife roll 20 when rotation of yoke 10 results in the alternative positioning of each of the plurality of knife rolls 20 proximal anvil roll 50.

The embodiment of the present invention depicted in FIG. 6(*b*) is similar to that depicted in FIGS. 5*a*(*a*)/5(*b*) and FIG. 6(*a*), with the distinct aspect of blade 85 attached to one or more of the plurality of knife rolls 20 comprises a rigid structure with an upper (secured) end proximal and attached to knife roll 20 and a lower (distal) end comprising cutting element 88, wherein blade 85 is separably attached to each of the one or more knife rolls 20 of orbital knife 1 so that blade 85 is displaceable with respect to its respective knife roll axis of rotation 26, with the result that the cut radius CR of blade 85 can be varied, with the result that the force with which the cutting element 88 disposed on blade 85 presses against the surface of the anvil roll 50 against which the web 100 is compressed can be varied.

Furthermore, in alternative embodiments of the foregoing embodiment of the present invention (see FIG. 6(*b*)), a compressible member 86 is positioned between the upper (secured) end of blade 85 and the portion of knife roll 20 to which blade 85 is separably attached. Use of such a compressible member 86 allows for cutting element 88 to extend radially toward and proximal the center of knife roll 20. Blade 85 effectuates a cut of web 100 distinctly from blade 80 of other embodiments described herein in that the cutting force is generated by the entire blade 85 moving and compressing an elastic support member 86 instead of the blade 80 itself flexing and behaving like a stiff spring.

Figure 7:
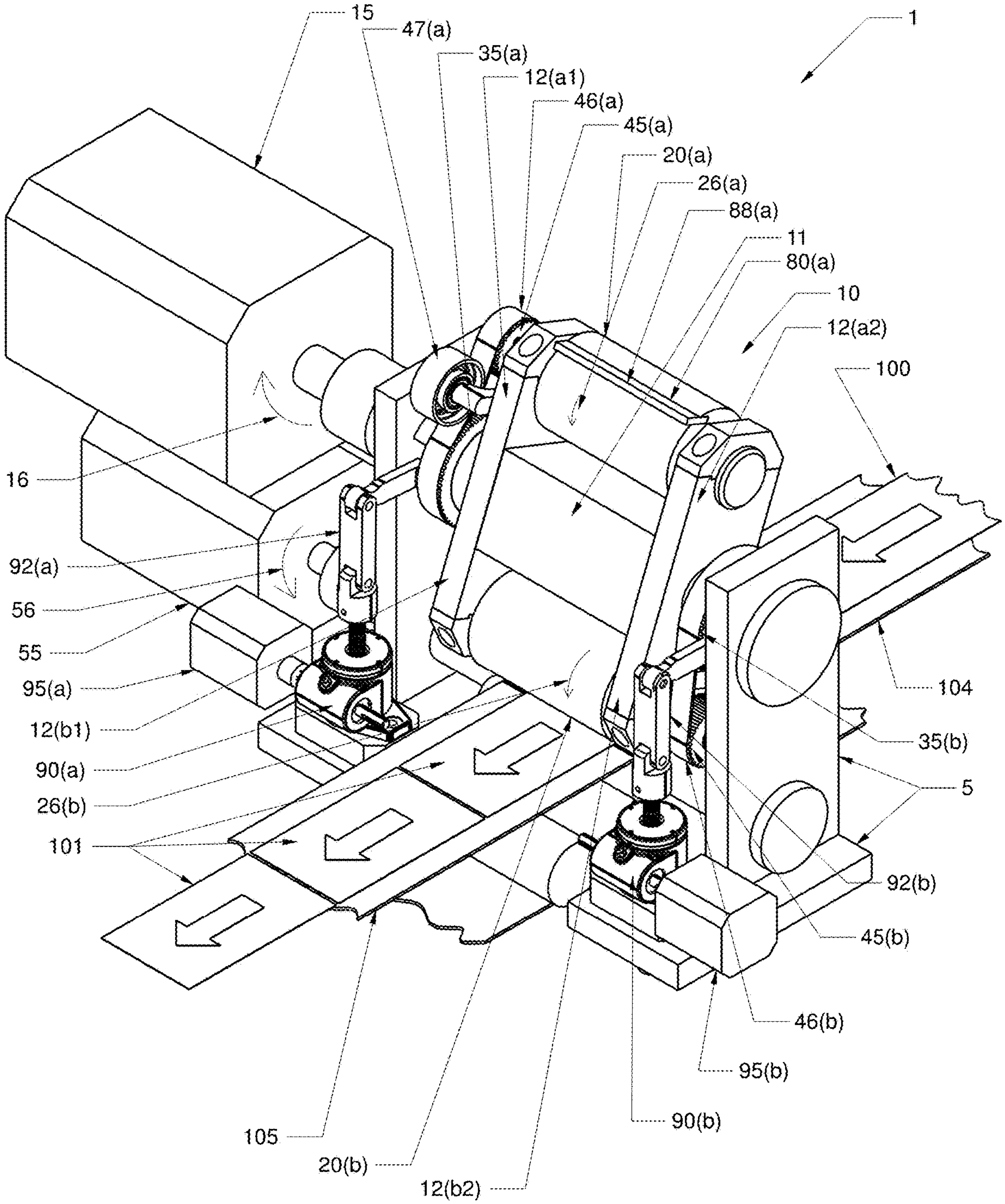
FIG. 7 is a perspective view of an embodiment of the present invention.
Figure 8A:
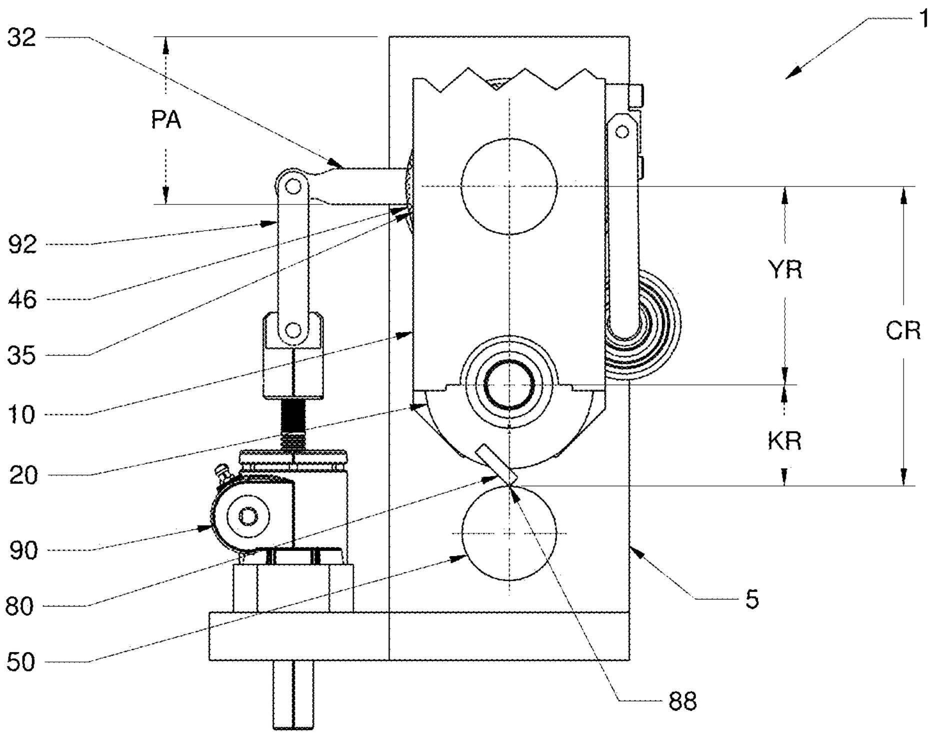
FIG. 8(*a*) is an elevation view of an embodiment of the present invention.
Figure 8B:
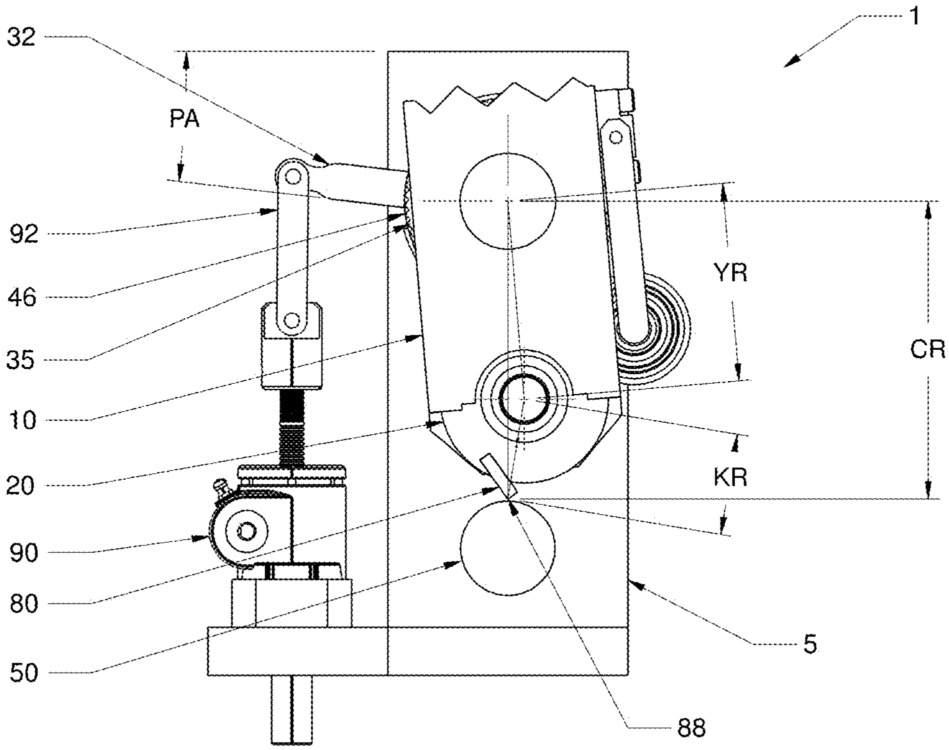
Figure 8C:
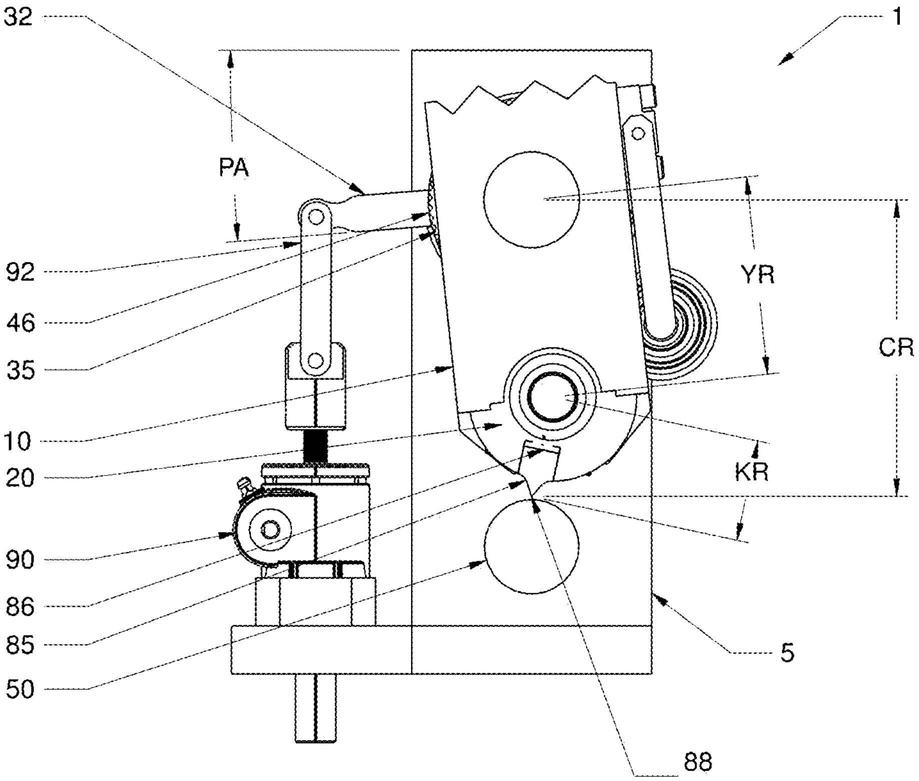

An alternative embodiment of the present invention comprising an orbital knife 1 is depicted in FIGS. 7, 8*a*, and 8(*b*). With respect to such embodiment, orbital knife 1 comprises (a) a support structure 5 and (b) a yoke 10 rotatably attached to the support structure 5 with a yoke axis of rotation 16 and having a yoke hub 11 substantially concentric with yoke axis of rotation 16 and one or more yoke arms 12 positioned laterally with respect to and attached to the yoke hub 11. In the embodiment of orbital knife 1 shown in FIG. 7, the one or more yoke arms 12 comprise (i) plurality of yoke arms 12(*a*1) and 12(*a*2) with yoke arm 12(*a*2) spaced apart from yoke arm 12(*a*1) and (ii) plurality of yoke arms 12(*b*1) and 12(*b*2) with yoke arm 12(*b*2) spaced apart from yoke arm 12(*b*1).

In preferred embodiments of this alternative embodiment of orbital knife 1, yoke 10 is connected to drive motor 15 which provides the rotational force to rotate yoke 10 about yoke rotational axis 16. In yet other preferred embodiments of this alternative embodiment of orbital knife 1, rotation of yoke 10 about yoke rotational axis 16 may be effectuated by any suitable means known in the art to rotate yoke 10.

Orbital knife 1 further comprises one or more knife rolls 20 radially displaced from and parallel to yoke hub 11, each of the one or more knife rolls 20 having its own axis of rotation 26. In certain embodiments of this alternative embodiment, orbital knife 1 comprises a plurality of knife rolls 20(*a*) and 20(*b*), with knife roll 20(*a*) having axis of rotation 26(*a*) and positioned parallel to yoke hub 11 and knife roll 20(*b*) having axis of rotation 26(*b*) and positioned parallel to yoke hub 11. Each of the one or more knife rolls 20 is securely connected to one or more yoke arms 12 of yoke 10 using means known in the art.

Yoke arms 12 are positioned so that the knife roll axis of rotation 26 is parallel to the yoke axis of rotation 16. In preferred embodiments of this alternative embodiment of orbital knife 1 wherein orbital knife 1 comprises a plurality of knife rolls 20(*a*) and 20(*b*) such as that shown in FIG. 7, (a) first knife roll 20(*a*) is securely connected to yoke 10 via first knife roll first yoke arm 12(*a*1) and first knife roll second yoke arm 12(*a*2) spaced apart from first knife roll first yoke arm 12(*a*1) and (b) second knife roll 20(*b*) is securely connected to yoke 10 via second knife roll first yoke arm 12(*b*1) and second knife roll second yoke arm 12(*b*2) spaced apart from second knife roll first yoke arm 12(*b*1). First knife roll first yoke arm 12(*a*1) can be attached to, integral with, or separate from yoke hub 11 and first knife roll second yoke arm 12(*a*2) can be attached to, integral with, or separate from yoke hub 11. Yoke arms 12 are positioned so that the knife roll axis of rotation 26 for the knife roll 20 secured by such yoke arms 12 is parallel to yoke axis of rotation 16.

Further, separably attached to each knife roll 20 of orbital knife 1 according to this embodiment of orbital knife 1 is blade 80 comprising a cutting element 88 positioned parallel to the knife roll 20 to which blade 80 is separably attached.

This alternative embodiment of orbital knife 1 further comprises an anvil roll 50 rotatably attached to support structure 5, such anvil roll 50 having anvil roll axis of rotation 56 parallel to the yoke axis of rotation 26. In preferred embodiments of this alternative embodiment of orbital knife 1, anvil roll 50 is connected to drive motor 55 which provides the rotational force to rotate anvil roll 50 about anvil roll rotational axis 56. In yet other preferred embodiments of this alternative embodiment of orbital knife 1, rotation of anvil roll 50 may be effectuated by any suitable means known in the art to rotate anvil roll 50.

Web 100 is compressed between one of the one or more knife rolls 20 and anvil roll 50, with web 100 cut into individual cut web pieces 101 alternatively by the blade 80 attached to the knife roll 20 of such one or more knife rolls 20 when rotation of yoke 10 results in the positioning of such knife roll 20 proximal anvil roll 50. Web 100 may or may not be in contact with knife roll 20 to effectuate a cut, with all that is required to effectuate a cut is contact between cutting element 88 of blade 80 and web 100.

For orbital knife 1 of this embodiment, rotation of the one or more knife rolls 20 is effectuated by a belt and pulley system. Such system comprises one or more sun pulleys 35 wherein each of the one or more sun pulleys 35 is connected to one of the one or more planet pulleys 45 connected to one or more knife rolls 20 wherein each of the one or more sun pulleys 35 has an axis of rotation concentric with the yoke rotational axis 16 of the yoke 10. The one or more sun pulleys 35 may be held stationary relative to support structure 5 such that its pitch diameter is concentric with the rotational axis of the yoke 10 or, alternatively, rotated about the axis of rotation of such sun pulley 35, with rotation of sun pulley 35 effectuated by using any one of many means known in the art.

Further, in such alternative embodiments of orbital knife 1, attached to each knife roll 20 is a planet pulley 45 (*i*) having an axis of rotation concentric with the axis of rotation of the respective knife roll 20 and (ii) joined via a drive belt 46 with sun pulley 35 wherein drive belt 46 loops around both pulleys 35 and 45 such that rotation of sun pulley 35 causes rotation of planet pulley 45 effectuated by the force imparted by the displaceable drive belt 46 [see FIGS. 7, 8(*a*), 8(*b*)]. Such drive belt 46 is held in appropriate contact with pulleys 35 and 45 by tensioning member 47 attached to one of the yoke arms 12. A separate drive belt 46 is associated with each pair of sun pulley 35 and planet pulley 45 such that each of a plurality of knife rolls 20 is driven independently from any other knife roll 20, each knife roll 20 having its own pair of sun pulley 35 and planet pulley 45. In preferred embodiments of this alternative embodiment of orbital knife 1, (a) a first knife roll 20(*a*) has rigidly attached thereto a first planet pulley 45(*a*) joined via a first drive belt 46(*a*) with a first sun pulley 35(*a*) wherein first drive belt 46(*a*) is held in appropriate contact with first pulleys 35(*a*) and 45(*a*) by first tensioning member 47(*a*), and (*b*) a second knife roll 20(*b*) has rigidly attached thereto a second planet pulley 45(*b*) joined via a second drive belt 46(*b*) with a second sun pulley 35(*b*) wherein second drive belt 46(*b*) is held in appropriate contact with second pulleys 35(*b*) and 45(*b*) by second tensioning member 47(*b*).

In such embodiment of the orbital knife 1, rotation of the yoke 10 about its axis of rotation 16 while a sun pulley 35 is held stationary with respect to the support structure 5 will effectuate a rotation of the respective planet pulley 45 and rotation of its respective knife roll 20 about its axis of rotation 26. Further, the ratio of the sun pulleys 35 pitch radii and planet pulleys 45 pitch radii is established using any means known in the art such that operation of orbital knife 1 produces a precisely repeating pattern of locations of the cutting element 88 associated with each knife roll 20 with respect to anvil roll 50, which obviates cutting element 88 of blade 80 attached to knife roll 20 impinging or contacting anvil roll 50 during yoke 10 rotation. Further, orbital knife 1 has, for a particular cut setting, a key operational parameter called the cut radius CR [FIGS. 8(*a*) and 8(*b*)] which is defined as the straight-line distance from the center of rotation of yoke 10 to cutting element 88.

The force required to effectuate the rotation of sun pulley 35 can be achieved using any means known in the art. In preferred embodiments, orbital knife 1 comprises one or more phasing actuators 90 [depicted in FIG. 7 as a plurality of phasing actuators 90(*a*) and 90(*b*)], with an upper section and a lower section wherein the lower section is attached to support structure 5 of orbital knife 1 and a phasing link 92 is disposed at the upper section of actuator 90.

With reference to FIGS. 8(*a*) and 8(*b*), rotation of the one or more sun pulleys 35 with respect to the support structure 5 causes rotation of the respective [mated] planet pulley 45, thereby modifying the cut radius CR of knife roll 20 associated with the rotating sun pulley 35/planet pulley 45. That is, the orientation of sun pulley 35-planet pulley 45, wherein the rotating of sun pulley 35 effectuates the rotation of planet pulley 45 allows for modification of the cut radius CR during operations of orbital knife 1. Further, with each knife roll 20 of the orbital knife 1 according to the present invention having associated therewith a sun pulley 35 that is not associated with any other knife roll 20 allows for independent adjustment of each knife roll 20's cut radius CR.

In preferred embodiments of the invention wherein force for rotation of the one or more sun pulleys 35 is provided by one or more actuators 90, orbital knife 1 further comprises a phasing arm 32 attached to each of the one or more sun pulleys 35, each phasing arm 32 having a first end and a second end, wherein (a) the first end of phasing arm 32 is rotatably attached to phasing link 92 and the second end of phasing arm 32 is rigidly attached to sun pulley 35, and (b) rotation of phasing arm 32 effectuates rotation of sun pulley 35 about its axis of rotation thereby controlling the rotational position of the sun pulley 35 relative to the stationary support structure 5 and thus another key operational parameter called the phase angle PA [see FIGS. 8(*a*) and 8(*b*)] which is a measure of the amount of rotation of sun pulley 35 relative to a fixed reference and wherein phase angle PA for the instant invention is defined as angle from the upper lateral plane of support structure 5 to the lateral plane occupied by phasing arm 32 extending through the center of sun pulley 35. In embodiments of orbital knife 1 comprising a plurality of sun pulleys 35(*a*) and 35(*b*), rigidly attached to sun pulley 35(*a*) is phasing arm 32(*a*) and rigidly attached to sun pulley 35(*b*) is phasing arm 32(*b*) [see FIG. 7].

The force required to effectuate the rotation of phasing arm 32 can be achieved using any means known in the art. In preferred embodiments, force is provided by one or more actuator motors 95 connected to one or more actuators 90, with each motor 95 connected to one actuator 90. In alternative preferred embodiments as shown in FIG. 7, orbital knife 1 comprises a plurality of actuators 90(*a*) and 90(*b*) wherein each such actuator 90 is connected to a plurality of actuator motors 95(*a*) and 95(*b*).

The rotation of the one or more sun pulleys 35 allows for operational control of phase angle PA (i.e., a measure of the rotational position of each of the sun pulleys 35 with respect to the stationary support structure 5), with in-operation (on the fly) rotation of the one or more sun pulleys 35 (that is, rotation of the one or more sun pulleys 35 during active (ongoing) web 100 cutting operations driving the one or more planet pulleys 45), allowing for a change of the cut radius CR of each of the one or more blades 80 of orbital knife 1 resulting in a modification of deflection of cutting element 88 associated with each of the one or more blades 80 attached to each of the one or more knife rolls 20 associated with each such rotation sun pulley 35, thus obviating use of an adjustable anvil 53 in prior art cutting apparatus P and adjustment of such anvil 53 to effectuate a change in blade deflection and resulting in an apparatus (i.e., orbital knife 1 according to the present invention) that has less parts and is less expensive to acquire and maintain than prior art prior cutting apparatuses P. In other words, the rotation of sun pulley 35 of orbital knife 1 according to the present invention allows a user of orbital knife 1 to change the cut radius CR, and hence blade deflection and the cutting force with which cutting element 88 on blade 80 contact anvil roll 50, of each of the one or more blades 80 on the fly during operations to allow for a continuous cutting operation during which the optimal blade 80 deflection is maintained without the need for multiple batch (run) operations (i.e., operation of prior art cutting apparatus P with a first cut radius CR, stoppage of operation [defining a first batch {run} operation], modification of prior art cutting apparatus P by adjusting the position of cutting element 88 of blade 80 relative to the center of rotation a of the knife roll 20 to effectuate a change of cut radius CR and hence effectuating a change in the blade 80 deflection during the cutting operation or, alternatively, changing the deflection of the blade 80 of cutting apparatus P by changing the position of the anvil 53 relative to the center of rotation of the anvil roll 50 to effectuate a change in the deflection of blade 80 with cutting element 88, with any of the foregoing requiring the aforementioned stoppage of operations of cutting apparatus P to change cutting element 88 deflection and thereafter recommencing operations of cutting apparatus P [defining a second batch {run} operation]). The on-the-fly CR adjustability provided by orbital knife 1 according to the present invention allows for continuous maintenance of optimal blade interference to make web 100 cutting operations more efficient.

In a cutting operation, cut radius CR is at a maximum when yoke radius YR, which is defined as the straight-line distance from the yoke axis of rotation 16 to the knife roll axis of rotation 26, and the knife radius KR, another key operational parameter defined as the straight-line distance from the knife roll axis of rotation 26 to cutting element 88 of blade 80 of knife roll 20, lie in a common plane as illustrated in FIG. 8(*a*). Moving the knife roll axis of rotation 26 out of the common plane will cause a reduction of cut radius CR as illustrated in FIG. 8(*b*) and is effectuated by rotation of sun pulley 35. In practice, the optimal cut radius CR for any given circumstance is something less than the maximum cut radius CR. Further, the optimal blade 80 deflection with related cut radius CR may change over time depending on operating conditions. In the present invention, maintenance of an optimal blade deflection and associated cut radius CR can be achieved since cut radius CR of each of the one or more blades 80 of orbital knife 1 can be varied during web cutting operation without stopping orbital knife 1 operations as is required of a prior art cutting apparatus P.

During operation of orbital knife 1 with one or more knife rolls 20 on which is attached a blade 80 with cutting element 88, yoke 10 rotates about its axis of rotation 16, and anvil roll 50 rotates about its axis of rotation 56. In preferred embodiments comprising an actuator 90-phasing link 92-phasing arm 32 arrangement as described herein, rotation of one or more sun pulleys 35 resulting from the displacement of a phasing link 92 associated with each sun pulley 35, with such displacement of phasing link 92 in preferred embodiments effectuated by actuator 90. Phasing link 92 displacement effectuates displacement of phasing arm 32, which in turn effectuates rotation of the associated sun pulley 35. Rotation of the sun pulley 35 results in the rotation of the planet pulley 45 with which the sun pulley 35 is in contact via drive belt 46 forming a belt and pulley system. Sun pulley 35 rotation effectuates a rotation of the associated knife roll 20 about such knife roll 20's axis of rotation 26, thereby changing the relationship between the yoke radius YR and the knife radius KR with a corresponding change in the cut radius CR and therefore changing blade 80 deflection.

Web 100 passes through orbital knife 1 on the conveyor comprising two segments, being fed to orbital knife 1 by being disposed on infeed conveyor 104 which is spaced apart from discharge conveyor 105, resulting in a gap between conveyor segments 104 and 105. In the gap, web 100 is disposed on anvil roll 50 positioned below web 100. Rotation of yoke 10 about its axis of rotation 16 results in the positioning of knife roll 20 proximal anvil roll 50 and cutting element 88 of blade 80 attached to knife roll 20 being positioned above web 100 in this gap, with cutting element 88 positioned above and in contact with web 100 which in turn is positioned above and in contact with anvil roll 50. A load (force) is imposed on anvil roll 50 by the blade 80 of knife roll 20 which compresses web 100 in this gap, with web 100 cut into individual cut web pieces 101 by blade 80 of knife roll 20 when rotation of yoke 10 results in the positioning of knife roll 20 proximal anvil roll 50.

Yet another preferred embodiment of the alternative embodiment entails orbital knife 1 comprising a blade 85 (FIG. 8(*c*)) comprising a rigid structure with an upper secured end proximal and attached to knife roll 20 and a lower (distal) end comprising cutting element 88, wherein a blade 85 is separably attached to each of the one or more knife rolls 20 of orbital knife 1 (i.e., each knife roll 20 having at least one blade 85 that is not attached to any other knife roll 20) so that blade 85 is displaceable with respect to its respective knife roll axis of rotation 26 (with the result that the force of contact between the leading end of blade 85 comprising cutting element 88 and the surface of the anvil roll 50 against which the web 100 is compressed can be varied). Furthermore, in alternative embodiments of the foregoing embodiment of the present invention (see FIG. 8(*c*)), a compressible member 86 is positioned between the upper (secured) end of blade 85 and the portion of knife roll 20 to which blade 85 is separably attached. Use of such a compressible member 86 allows for cutting element 88 to extend radially toward and proximal the center of knife roll 20. Blade 85 effectuates a cut of web 100 distinctly from blade 80 of other embodiments described herein in that the cutting force is generated by the entire blade 85 moving and compressing an elastic support member 86 instead of the blade 80 itself flexing and behaving like a stiff spring.

Figure 9:
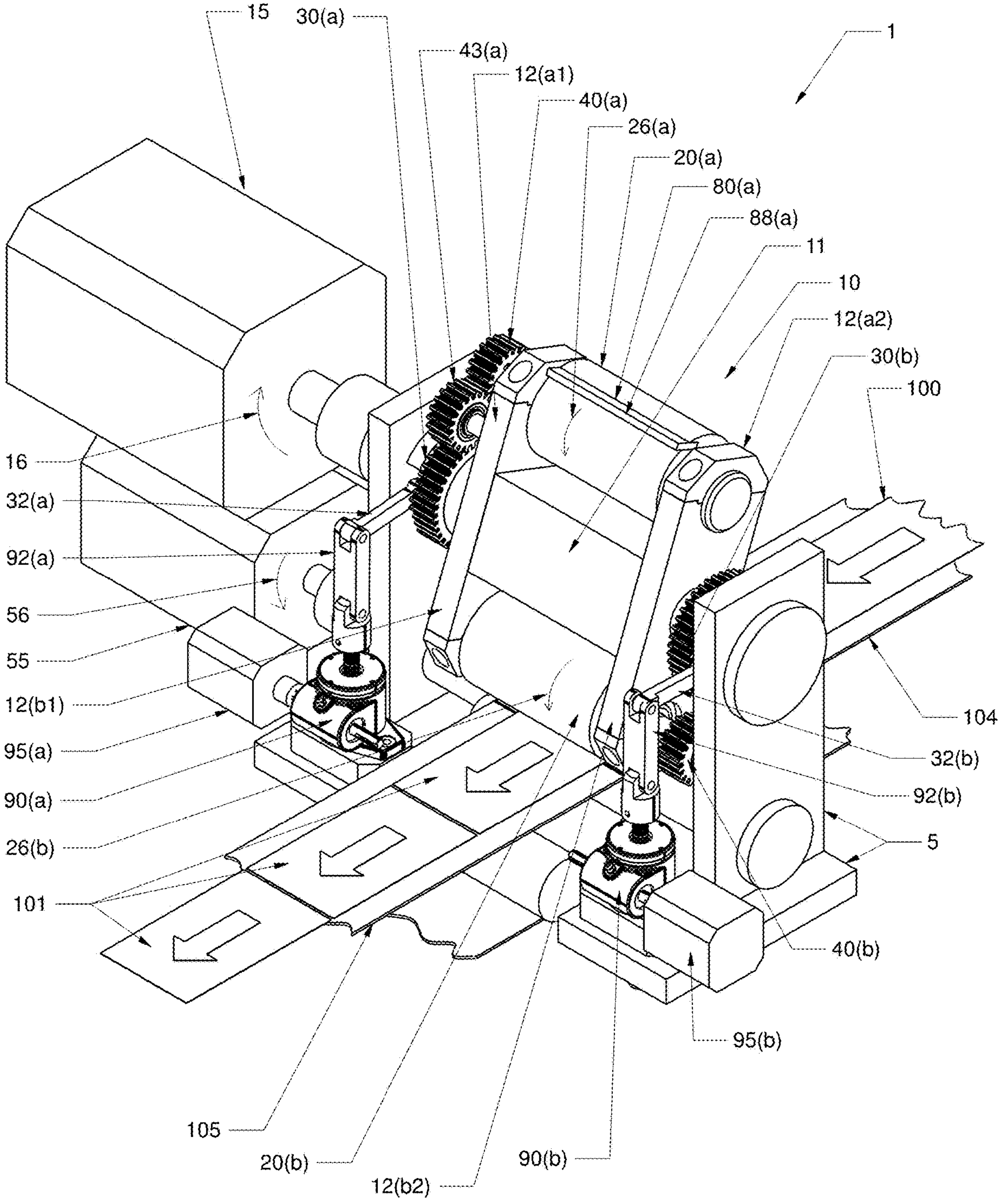
FIG. 9 is a perspective view of an embodiment of the present invention.

An alternative embodiment of the present invention comprising an orbital knife 1 is depicted in FIG. 9. With respect to such embodiment, orbital knife 1 comprises (a) support structure 5 and (b) yoke 10 rotatably attached to the support structure 5 with a yoke axis of rotation 16 and having a yoke hub 11 substantially concentric with yoke axis of rotation 16 and one or more yoke arms 12 positioned laterally with respect to and attached to the yoke hub 11. In the embodiment shown in FIG. 9, the one or more yoke arms 12 comprise (i) plurality of yoke arms 12(*a*1) and 12(*a*2) spaced apart from yoke arm 12(*a*1) and (ii) plurality of yoke arms 12(*b*1) and 12(*b*2) spaced apart from yoke arm 12(*b*1). Yoke arms 12 are positioned so that the knife roll axis of rotation 26 is parallel to the yoke axis of rotation 16.

Further with reference to FIG. 9, radially displaced from yoke hub 11 is one or more knife rolls 20, each knife roll 20 having its own axis of rotation 26 and positioned parallel to the yoke hub 11. In certain embodiments of this alternative embodiment, orbital knife 1 comprises a plurality of knife rolls 20(*a*) and 20(*b*), with knife roll 20(*a*) having axis of rotation 26(*a*) and positioned parallel to yoke hub 11 and knife roll 20(*b*) having axis of rotation 26(*b*) and positioned parallel to yoke hub 11.

Further with reference to FIG. 9, an embodiment of the present invention of orbital knife 1 further comprises one or more blades 80 attached to each of the one or more knife rolls 20, wherein each blade 80 comprises an upper end proximal the knife roll 20 and a lower end comprising a cutting element 88 positioned parallel to the knife roll 20 to which the blade 80 is attached. An embodiment of the present invention of orbital knife 1 further comprises an anvil roll 50 rotatably connected to support structure 5, wherein anvil roll 50 has an axis of rotation 56 parallel to rotational axis 16 of yoke 10.

In preferred embodiments of orbital knife 1 comprising a plurality of knife rolls 20(*a*) and 20(*b*), first knife roll 20(*a*) has separably attached thereto first blade 80(*a*) comprising first blade cutting element 88(*a*) and second knife roll 20(*b*) has separably attached thereto second blade 80(*b*) comprising second blade cutting element 88(*b*). In preferred embodiments of orbital knife 1 comprising a plurality of knife rolls 20(*a*) and 20(*b*) and a rotating yoke 10, web 100 is compressed alternatively between blade 80(*a*) and blade 80(*b*) with disposed cutting elements 88(*a*) and 88(*b*) separably attached to knife rolls 20(*a*) and 20(*b*) depending on the rotational position of yoke 10, and anvil roll 50, with web 100 cut into individual cut web pieces 101 alternatively by blade 80(*a*) attached to knife roll 20(*a*) when rotation of yoke 10 results in the positioning of knife roll 20(*a*) proximal anvil roll 50 and blade 80(*b*) attached to knife roll 20(*b*) when rotation of yoke 10 results in the positioning of knife roll 20(*b*) proximal anvil roll 50. Web 100 may or may not be in contact with knife roll 20 to effectuate a cut, with all that is required to effectuate a cut is contact between cutting element 88 of blade 80 and web 100.

This embodiment of orbital knife 1 differs from the embodiment described above and depicted in FIGS. 2, 5(*a*)/5(*b*), and 6(*a*) in that rotation of the one or more knife rolls 20 is effectuated by a gear train comprising a driving gear, driven gear, and idler gear placed between the driving and driven gears rather than a gear train with simply driving and driven gears or a belt and pulley system. Specifically, and with reference to FIG. 9, orbital knife 1 according to this embodiment further comprises one or more a sun gears 30 attached to support structure 5, one or more planet gears 40 with each of the planet gears 40 attached to a knife roll 20, and one or more idler gears 43 wherein each idler gear 43 is inserted between and in simultaneous mated [mesh] contact with at least one sun gear 30 and at least one planet gear 40.

Each of the one or more planet gears 40 has an axis of rotation concentric with the axis of rotation of the respective knife roll 20 and having a specified pitch radius so that rotation of the yoke 10 about its axis of rotation while the sun gears 30 are held stationary with respect to the support structure 5 will effectuate a rotation of idler gear 43 which in turn causes a rotation of the respective planet gear 40 and in turn the associated knife roll 20.

In preferred embodiments and with reference to FIG. 9, orbital knife 1 comprises (a) a first sun gear 30(*a*) and a second sun gear 30(*b*), (*b*) a first planet gear 40(*a*) and a second planet gear 40(*b*), and (*c*) a first idler gear 43(*a*) inserted between and in simultaneous mated contact with first sun gear 30(*a*) and first planet gear 40(*a*) and a second idler gear 43(*b*) inserted between and in simultaneous mated contact with second sun gear 30(*b*) and second planet gear 40(*b*). Each sun gear 30 has an axis of rotation concentric with the yoke rotational axis 16 and has a pitch radius such that the sun gear 30 pitch diameter is concentric with yoke rotational axis 16.

Further, the ratio of the sun gear 30 pitch radii and planet gear 40 pitch radii is established such that operation of orbital knife 1 produces a precisely repeating pattern of locations of the positioning of the cutting element 88 associated with each knife roll 20 with respect to support structure 5, which obviates cutting element 88 of blade 80 attached to knife roll 20 impinging or contacting anvil roll 50 during yoke 10 operation. Further, orbital knife 1 has, for a particular cut setting, a key operational parameter called the cut radius CR which is defined as the straight-line distance from the center of rotation of yoke 10 to cutting element 88.

The force required to effectuate the rotation of sun gear 30 can be achieved using any means known in the art. In preferred embodiments, orbital knife 1 further comprises one or more phasing actuators 90 [depicted in FIG. 9 as a plurality of phasing actuators 90(*a*) and 90(*b*)] with an upper section and a lower section wherein the lower section is attached to support structure 5 of orbital knife 1 and a phasing link 92 is disposed at the upper section of actuator 90. The orientation of sun gear 30-idler gear 43-planet gear 40 allows for modification of the cut radius CR during operations of orbital knife 1. Further, with each knife roll 20 of the orbital knife 1 according to the present invention having associated therewith a sun gear 30 that is not associated with any other knife roll 20 allows for independent adjustment of each knife roll 20's cut radius CR.

In embodiments wherein force for rotation of the sun gear 30 is provided by one or more actuators 90, orbital knife 1 further comprises a phasing arm 32 attached to each of the one or more sun gears 30, each phasing arm 32 having a first end and a second end, wherein (a) the first end of phasing arm 32 is rotatably attached to phasing link 92 and the second end of phasing arm 32 is rigidly attached to sun gear 30, and (b) rotation of phasing arm 32 effectuates rotation of sun gear 30 about its axis of rotation thereby controlling the rotational position of sun gear 30 relative to support structure 5 which is measured by the key operational parameter called the phase angle PA which is a measure of the amount of rotation of sun gear 30 relative to a fixed reference and wherein phase angle PA for the instant invention is defined as the angle from the upper lateral plane of support structure 5 to the lateral plane occupied by phasing arm 32 extending through the center of sun gear 30. In embodiments of orbital knife 1 comprising a plurality of sun gears 30(*a*) and 30(*b*), rigidly attached to sun gear 30(*a*) is phasing arm 32(*a*) and rigidly attached to sun gear 30(*b*) is phasing arm 32(*b*) [see FIG. 9].

Further, in preferred embodiments wherein the force for rotation of sun gears 30 is provided through one or more actuators 90, force is provided by one or more actuator motors 95 connected to one or more actuators 90, with each motor 95 connected to one actuator 90. In alternative preferred embodiments as shown in FIG. 9, orbital knife 1 comprises a plurality of actuators 90(*a*) and 90(*b*) wherein each such actuator 90 is connected to a plurality of actuator motors 95(*a*) and 95(*b*).

The rotation of the one or more sun gears 30 allows for operational control of phase angle PA of each of the sun gears 30 (i.e., the rotational position of each of the sun gears 30 with respect to the stationary support 5), with in-operation (on the fly) rotation of the one or more sun gears 30 (that is, rotation of the one or more sun gears 30 during active (ongoing) web 100 cutting operations, with such rotation driving planet gear 40 via idler gear 43), thus allowing for a change of the cut radius CR of each of the one or more blades 80 resulting in a modification of deflection of cutting element 88 associated with each of the one or more blades 80 attached to each of the one or more knife rolls 20 associated with each such rotating sun gear 30, thus obviating use of an adjustable anvil 53 in prior art cutting apparatus P and adjustment of such anvil 53 to effectuate a change in blade deflection and resulting in an apparatus (i.e., orbital knife 1) that has less parts and is less expensive to acquire and maintain than prior art cutting apparatuses P. In other words, the rotation of sun gear 30 according to the present invention allows a user of orbital knife 1 to change the cut radius CR, and hence blade deflection and the cutting force with which cutting element 88 on blade 80 contact anvil roll 50, of each of the one or more blades 80 on the fly during operations to allow for a continuous cutting operation during which the optimal blade 80 deflection is maintained without the need for multiple batch (run) operations (i.e., operation of prior art cutting apparatus P with a first cut radius CR, stoppage of operation [defining a first batch {run} operation], modification of prior art cutting apparatus P by adjusting the position of cutting element 88 of blade 80 relative to the center of rotation of the knife roll 20 to effectuate a change of cut radius CR and hence effectuating a change in the blade 80 deflection during the cutting operation or, alternatively, changing the deflection of the blade 80 of cutting apparatus P by changing the position of the anvil 53 relative to the center of rotation of the anvil roll 50 to effectuate a change in the deflection of blade 80 with cutting element 88, with any of the foregoing requiring the aforementioned stoppage of operations of cutting apparatus P to change cutting element 88 deflection and thereafter recommencing operations of cutting apparatus P [defining a second batch {run} operation]). The on-the-fly CR adjustability provided by orbital knife 1 according to the present invention allows for continual maintenance of optimal blade interference to make web 100 cutting operations more efficient.

In a cutting operation, cut radius CR is at a maximum when yoke radius YR, which is defined as the straight-line distance from the yoke axis of rotation 16 to the knife roll axis of rotation 26, and the knife radius KR, another key operational parameter defined as the straight-line distance from the knife roll axis of rotation 26 to cutting element 88 of blade 80 of knife roll 20, lie in a common plane. Moving the knife roll axis of rotation 26 out of the common plane will cause a reduction of cut radius CR and is effectuated by rotation of sun gear 30. In practice, the optimal cut radius CR for any given circumstance is something less than the maximum cut radius CR. Further, the optimal blade 80 deflection with related cut radius CR may change over time depending on operating conditions. In the present invention, maintenance of an optimal blade deflection and associated cut radius CR can be achieved since cut radius CR of each of the one or more blades 80 of orbital knife 1 can be varied during web cutting operation without stopping orbital knife 1 operations as is required of a prior art cutting apparatus P.

During operation of orbital knife 1 with one or more knife rolls 20 on which is attached a blade 80 with cutting element 88, yoke 10 rotates about its axis of rotation 16, and anvil roll 50 rotates about its axis of rotation 56. In preferred embodiments comprising an actuator 90-phasing link 92-phasing arm 32 arrangement as described herein, rotation of one or more sun gears 30 resulting from the displacement of a phasing link 92 associated with each sun gear 30, with such displacement of phasing link 92 in preferred embodiments effectuated by actuator 90. Phasing link 92 displacement effectuates displacement of phasing arm 32, which in turn effectuates rotation of the associated sun gear 30. Rotation of the sun gear 30 results in the rotation of the planet gear 40 via the idler gear 43 with which the sun gear 30 forms a gear train. Sun gear 30 rotation effectuates a rotation of the associated knife roll 20 about such knife roll 20's axis of rotation 26, thereby changing the relationship between the yoke radius YR and the knife radius KR with a corresponding change in the cut radius CR and therefore changing blade 80 deflection.

Web 100 passes through orbital knife 1 on the conveyor comprising two segments, being fed to orbital knife 1 by being disposed on infeed conveyor 104 which is spaced apart from discharge conveyor 105, resulting in a gap between conveyor segments 104 and 105. In the gap, web 100 is disposed on anvil roll 50 positioned below web 100. Rotation of yoke 10 about its axis of rotation 16 results in the positioning of knife roll 20 proximal anvil roll 50 and cutting element 88 of blade 80 attached to knife roll 20 being positioned above web 100 in this gap, with cutting element 88 positioned above and in contact with web 100 which in turn is positioned above and in contact with anvil roll 50. A load (force) is imposed on anvil roll 50 by the blade 80 of knife roll 20 which compresses web 100 in this gap, with web 100 cut into individual cut web pieces 101 by blade 80 of knife roll 20 when rotation of yoke 10 results in the positioning of knife roll 20 proximal anvil roll 50.

While embodiments of the invention have been illustrated and described, it is not intended that these embodiments illustrate and describe all possible forms of the invention. Rather, the words used in the specification are words of description rather than limitation, and it is understood that various changes may be made without departing from the sprit and scope of the invention.

We claim:

1. An orbital knife comprising:

a. a support structure;

b. a yoke rotatably attached to the support structure having a yoke axis of rotation, wherein the yoke comprises a yoke hub and a plurality of yoke arms;

c. one or more rotatable knife rolls radially displaced from and parallel to the yoke hub and securely connected to at least one of the plurality of yoke arms wherein each knife roll has an axis of rotation;

d. one or more blades attached to each of the one or more knife rolls and comprising a cutting element parallel to the knife roll to which the blade of such cutting element is attached;

e. one or more sun gears rotatably attached to the support structure wherein each sun gear has (1) an axis of rotation concentric with the yoke axis of rotation, and (2) associated therewith a sun gear pitch radius;

f. an anvil roll rotatably attached to the support structure and having an axis of rotation parallel to the yoke axis of rotation; and g. one or more planet gears, each with a planet gear axis of rotation and a planet gear pitch radius, wherein (1) each knife roll has attached thereto at least one planet gear, (2) each planet gear is mated with one of the one or more sun gears forming a gear train wherein the sun gear drives the planet gear and in each such gear train the planet gear pitch radius is substantially tangential to the sun gear pitch radius, and (3) the planet gear axis of rotation of each planet gear is concentric with the axis of rotation of the knife roll to which the planet gear is attached.

2. The orbital knife as claimed in claim 1, further comprising one or more phasing actuators wherein each phasing actuator is attached to the support structure, provides a force for rotation of the one or more sun gears, and comprises a phasing link, wherein each phasing link has rotatably attached thereto a sun gear phasing arm that is attached to one sun gear, and wherein rotation of each of the one or more sun gears about the axis of rotation of such sun gear is effectuated by the transfer of the phasing actuator force to the sun gear phasing arm attached to such sun gear via the phasing link of such phasing actuator attached to such sun gear phasing arm.

3. The orbital knife as claimed in claim 1, wherein a compressible member is positioned between at least one of the one or more blades and the knife roll to which such one of the one or more blades is attached.

4. The orbital knife as claimed in claim 1, wherein the one or more rotatable knife rolls comprises a first knife roll and a second knife roll.

5. The orbital knife as claimed in claim 1, wherein the one or more rotatable knife rolls comprises a first knife roll, a second knife roll, a third knife roll, and a fourth knife roll.

6. The orbital knife as claimed in claim 2, wherein the rotational force of at least one of the one or more phasing actuators is effectuated by rotational force provided by an actuator motor directly connected to such one of the one or more phasing actuators.

7. The orbital knife as claimed in claim 2, wherein:

a. the one or more rotatable knife rolls comprises a first knife roll and a second knife roll;

b. the one or more phasing actuators comprises a first phasing actuator comprising a first phasing link and a second phasing actuator comprising a second phasing link;

c. the yoke comprises a plurality of yoke arms wherein each knife roll is attached to two yoke arms;

d. the one or more planet gears comprises a first planet gear attached to the first knife roll and a second planet gear attached to the second knife roll; and e. the one or more sun gears comprises a first sun gear in mated contact with the first planet gear and having attached thereto a first phasing arm rotatably attached to the first phasing link and a second sun gear in mated contact with the second planet gear and having attached thereto a second phasing arm rotatably attached to the second phasing link.

8. The orbital knife as claimed in claim 7, wherein:

a. the rotational force for the first phasing actuator is effectuated by rotational force provided by a first actuator motor directly connected to the first phasing actuator; and b. The rotational force for the second phasing actuator is effectuated by rotational force provided by a second actuator motor directly connected to the second phasing actuator.

9. The orbital knife as claimed in claim 8, further comprising:

a. a yoke drive motor connected to the yoke;

b. an anvil roll drive motor connected to the anvil roll; and c. an oiler roller attached to the support structure.

10. The orbital knife as claimed in claim 7, wherein a compressible member is positioned between at least one of the plurality of blades and the knife roll to which such one of the plurality of blades is attached.

11. The orbital knife as claimed in claim 7, further comprising an oiler roller attached to the support structure.

12. The orbital knife as claimed in claim 2, wherein:

a. the one or more knife rolls comprises a first knife roll, a second knife roll, a third knife roll, and a fourth knife roll wherein each knife roll is securely connected to at least two of the plurality of yoke arms and has an axis of rotation;

b. the one or more blades comprises a first blade on the first knife roll, a second blade on the second knife roll, a third blade on the third knife roll, and a fourth blade on the fourth knife roll;

c. the one or more sun gears comprises a first sun gear with a first phasing arm attached thereto, a second sun gear with a second phasing arm attached thereto, a third phasing arm with a third phasing arm attached thereto, and a fourth sun gear with a fourth phasing arm attached thereto;

d. the one or more planet gears comprises a first planet gear attached to the first knife roll and mated with the first sun gear, a second planet gear attached to the second knife roll and mated with the second sun gear, a third planet gear attached to the third knife roll and mated with the third sun gear, and a fourth planet gear attached to the fourth knife roll and mated with the fourth sun gear;

e. the one or more phasing actuators comprises a first phasing actuator comprising a first phasing link with the first phasing arm attached to such first phasing link, a second phasing actuator comprising a second phasing link with the second phasing arm attached to such second phasing link, a third phasing actuator comprising a third phasing link with the third phasing arm attached to such third phasing link, and a fourth phasing actuator comprising a fourth phasing link with the fourth phasing arm attached thereto.

13. The orbital knife as claimed in claim 12, wherein a compressible member is positioned between at least one of the plurality of blades and the knife roll to which such one of the plurality of blades is attached.

14. The orbital knife as claimed in claim 12, wherein:

a. the rotational force for the first phasing actuator is effectuated by rotational force provided by a first actuator motor directly connected to the first phasing actuator;

b. the rotational force for the second phasing actuator is effectuated by rotational force provided by a second actuator motor directly connected to the second phasing actuator;

c. the rotational force for the third phasing actuator is effectuated by rotational force provided by a third actuator motor directly connected to the third phasing actuator; and d. the rotational force for the fourth phasing actuator is effectuated by rotational force provided by a fourth actuator motor directly connected to the third phasing actuator.

15. The orbital knife as claimed in claim 14, further comprising:

a. a yoke drive motor connected to the yoke;

b. an anvil roll drive motor connected to the anvil roll; and c. an oiler roller attached to the support structure.

16. The orbital knife as claimed in claim 12, wherein a compressible member is positioned between at least one of the plurality of blades and the knife roll to which such one of the plurality of blades is attached.

17. The orbital knife as claimed in claim 1, further comprising an oiler roller attached to the support structure.

18. The orbital knife as claimed in claim 1, further comprising a yoke drive motor connected to the yoke.

19. The orbital knife as claimed in claim 1, further comprising an anvil roll drive motor connected to the anvil roll.

* * * * *